US008811935B2

(12) United States Patent
Faccin et al.

(10) Patent No.: US 8,811,935 B2
(45) Date of Patent: Aug. 19, 2014

(54) EMERGENCY SERVICES IN HOME CELLS SYSTEM AND METHOD

(75) Inventors: Stefano M. Faccin, Irving, TX (US); Young Ae Kim, Rolling Meadows, IL (US); Johanna L. Dwyer, Kanata (CA); Mo-Han Fong, Kanata (CA); David Philip Hole, Slough (GB); M. Khaledul Islam, Kanata (CA); Paul Marcus Carpenter, Twickenham (GB); Jeffrey William Wirtanen, Kanata (CA); Maiyuran Wijayanathan, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 189 days.

(21) Appl. No.: 12/686,249

(22) Filed: Jan. 12, 2010

(65) Prior Publication Data
US 2011/0171926 A1 Jul. 14, 2011

(51) Int. Cl.
*H04W 36/00* (2009.01)
(52) U.S. Cl.
USPC ............ 455/404.1; 455/404.2; 455/444; 455/445; 455/449
(58) Field of Classification Search
CPC ............... H04W 4/22; H04W 76/007
USPC ............ 455/404.1, 444–449, 404.2
See application file for complete search history.

(56) References Cited

U.S. PATENT DOCUMENTS

| 7,787,600 | B1* | 8/2010 | Bari ........................... 379/45 |
| 2002/0105927 | A1 | 8/2002 | Holma et al. |
| 2006/0049934 | A1 | 3/2006 | Breen |
| 2006/0062237 | A1 | 3/2006 | Kim |
| 2007/0049276 | A1 | 3/2007 | Rimoni et al. |
| 2008/0009262 | A1* | 1/2008 | Rudolf et al. .............. 455/404.1 |
| 2008/0076420 | A1* | 3/2008 | Khetawat et al. .......... 455/435.1 |
| 2008/0102784 | A1 | 5/2008 | Mittal et al. |
| 2008/0267153 | A1 | 10/2008 | Mukherjee et al. |
| 2009/0097448 | A1 | 4/2009 | Vasudevan et al. |

(Continued)

FOREIGN PATENT DOCUMENTS

| WO | 9848575 | 10/1998 |
| WO | 9848575 A2 | 10/1998 |

(Continued)

OTHER PUBLICATIONS

3GPP TSG-RAN WG3 Meeting #60; Kineto Wireless Inc., ALU, NEC, Motorola; Title: Access Control for3G HNB Deployments; R3-081176; Kansas City, USA; May 5-9, 2008; 6 pgs.

(Continued)

*Primary Examiner* — Ajit Patel
*Assistant Examiner* — Julio Perez
(74) *Attorney, Agent, or Firm* — Conley Rose, P.C.; Maria L. Sekul; J. Robert Brown, Jr.

(57) ABSTRACT

A user equipment (UE) comprising a processor configured to cause the UE to transmit an emergency calls required indicator (ECRI) to a network component responsive to the UE receiving an instruction to place an emergency call; and to receive an emergency calls supported indicator (ECSI) prior to placing an emergency call, wherein a value of the ECSI indicates a type of emergency services supported by a femtocell, where the processor is further configured to cause the UE to transmit the ECRI before receiving the ECSI.

38 Claims, 4 Drawing Sheets

(56) References Cited

U.S. PATENT DOCUMENTS

| | | | |
|---|---|---|---|
| 2009/0311987 A1* | 12/2009 | Edge et al. | 455/404.1 |
| 2010/0008329 A1 | 1/2010 | De Jong et al. | |
| 2010/0296421 A1 | 11/2010 | Watfa et al. | |
| 2010/0329128 A1 | 12/2010 | Kuchibhotla et al. | |

FOREIGN PATENT DOCUMENTS

| | | |
|---|---|---|
| WO | 2004057899 A1 | 7/2004 |
| WO | 2009029409 A1 | 3/2009 |
| WO | 2009088824 A1 | 7/2009 |
| WO | 2010120689 A2 | 10/2010 |
| WO | 2010127331 A1 | 11/2010 |

OTHER PUBLICATIONS

3GPP TSG-RAN WG3 Meeting #60; Vodafone Group; Title: Support of Emergency Calls; R3-081124; Kansas City, USA; May 5-9, 2008; 5 pgs.

European Search and Examination Report; European Application No. 10187047.5; Dec. 27, 2010; 10 pgs.

3GPP TR 23.869; 3rd Generation Partnership Project; Technical Specification Group Services and System Aspects; Support for Internet Protocol (IP) based IP MultiMedia Subsystem (IMS) Emergency calls over General Packet Radio Service (GPRS) and Evolved Packet Service (EPS); (Release 9); Mar. 2009; 36 pages; V9.0.0 Technical Specification; 3GPP Organizational Partners.

3GPP TSG-RAN WG2 Meeting #65bis; R2-092174; Emergency Support Indication for IMS Emergency Call; Discussion and Decision; Alcatel-Lucent; Seoul, Korea; Mar. 23-27, 2009; 3 pages.

Partial European Search Report; Application No. 10187052.5; Feb. 28, 2011; 5 pages.

Extended European Search Report; Application No. 10187045.9; Feb. 28, 2011; 9 pages.

Faccin, Stefano M., et al.; U.S. Appl. No. 12/686,244, filed Jan. 12, 2010; Title: Selective Support and Establishment of Emergency Services in Home Cells.

Faccin, Stefano M., et al.; U.S. Appl. No. 12/686,245, filed Jan. 12, 2010; Title: System and Method for Supporting Emergency Services in Home Cells.

3GPP TR 23.830; 3rd Generation Partnership Project; Technical Specification Group Services and System Aspects; Architecture Aspects of Home NodeB and Home eNodeB; (Release 9); May 2009; 54 pages; V0.5.0 Technical Report; 3GPP Organizational Partners.

3GPP TS 36.331; 3rd Generation Partnership Project; Technical Specification Group Radio Access Network; Evolved Universal Terrestrial Radio Access (E-UTRA) Radio Resource Control (RCC); Protocol Specification; (Release 8); Jun. 2009; 207 pages; V8.6.0 Technical Specification; 3GPP Organizational Partners.

3GPP TS 36.304; 3rd Generation Partnership Project; Technical Specification Group Radio Access Network; Evolved Universal Terrestrial Radio Access (E-UTRA); User Equipment (UE) Procedures in Idle Mode; (Release 8); Jun. 2009; 30 pages; V8.6.0 Technical Specification; 3GPP Organizational Partners.

3GPP TS 25.304; 3rd Generation Partnership Project; Technical Specification Group Radio Access Network; User Equipment (UE) Procedures in Idle Mode and Procedures for Cell Reselection in Connected Mode; (Release 8); Jun. 2009; 49 pages; V8.6.0 Technical Specification; 3GPP Organizational Partners.

3GPP TS 22.220; 3rd Generation Partnership Project; Technical Specification Group Services and System Aspects; Service Requirements for Home NodeBs and Home eNodeBs; (Release 9); Jun. 2009; 22 pages; V9.1.0 Technical Specification; 3GPP Organizational Partners.

3GPP TSG-RAN WG2 Meeting #67; R2-095342; Change Request; TS 36.300 CR 0115 rev R2 Current version 9.0.0; Shenzhen, China; Aug. 24-28, 2009; 7 pages.

3GPP TSG-RAN WG2 #67; R2-094632; [66B#5] UMTSLTE: Inbound CSG mobility LTE; 4.2.1.1; Discussion and Decision; Motorola (Rapporteur); Shenzhen, China; Aug. 24-28, 2009; 28 pages.

3GPP TSG-RAN WG2#67; R2-094820; [66B#4] UMTSLTE; Inbound CSG mobility UMTS; Discussion and Decision; Qualcomm (Rapporteur); Aug. 24-28, 2009; Shenzhen, China; 17 pages.

Sauter, Martin; Voice over LTE via Generic Access (VoLGA); A Whitepaper; V1.0; http://www.wirelessmoves.com; Aug. 2009; 16 pages.

Extended European Search Report; Application No. 10187052.5; May 17, 2011; 14 pages.

3GPP TR 23.832 v0.5.1; 3rd Generation Partnership Project; Technical Specification Group Services and System Aspects; IMS Aspects of Architecture for Home NodeB; Stage 2; Release 9; Sep. 2009; 84 pages.

3GPP TS 23.216 v9.2.0; 3rd Generation Partnership Project; Technical Specification Group Services and System Aspects; Single Radio Voice Call Continuity (SRVCC); Stage 2; Release 9; Dec. 2009; 41 pages.

3GPP TS 23.401 v9.3.0; 3rd Generation Partnership Project; Technical Specification Group Services and System Aspects; General Packet Radio Service (GPRS) enhancements for Evolved Universal Terrestrial Radio Access Network (E-UTRAN); (Release 9); Dec. 2009; 254 pages.

3GPP TSG-RAN WG3 Meeting #60; R3-081176; Access Control for 3G HNB Deployments; Kineto Wireless Inc, ALU, NEC, Motorola; Kansas City; May 5-9, 2008; 6 pages.

3GPP TSG RAN3 #60; R3-081124; Support of Emergency Calls; Vodafone Group; Discussion & Approval; Kansas City; May 5-9, 2008; 5 pages.

3GPP TSG-SA WG1 Meeting #49; S1-100333; Title: Emergency Call Support when Resource is Unavailable on H(e) NB; Research in Motion, et al.; San Francisco, CA USA; Feb. 22-26, 2010; 2 pages.

3GPP TSG-SA WG1 Meeting #49; S1-100167; Title: Emergency Call Handling When Resource is Unavailable on H(e) NB (R8 and R9); Research in Motion; San Francisco, USA; Feb. 22-26, 2010; 1 page.

PCT Invitation to Pay Additional Fees; Application No. PCT/US2011/020920; Mar. 10, 2011; 7 pages.

PCT International Search Report; PCT Application No. PCT/US2011/029020; Apr. 19, 2011; 7 pages.

PCT Written Opinion of the International Searching Authority; PCT Application No. PCT/US2011/020920; Apr. 19, 2011; 12 pages.

PCT International Search Report; PCT Application No. PCT/US2011/020921; Mar. 25, 2011; 4 pages.

PCT Written Opinion of the International Searching Authority; PCT Application No. PCT/US2011/020921; Mar. 25, 2011; 8 pages.

PCT International Search Report; PCT Application No. PCT/US2011/020922; Mar. 23, 2011; 5 pages.

PCT Written Opinion of the International Searching Authority; PCT Application No. PCT/US2011/020922; Mar. 23, 2011; 7 pages.

Office Action dated Nov. 25, 2011; U.S. Appl. No. 12/686,245, filed Jan. 12, 2010; 21 pages.

Office Action dated Apr. 5, 2012; U.S. Appl. No. 12/686,244, filed Jan. 12, 2010; 30 pages.

Final Office Action dated Apr. 9, 2012; U.S. Appl. No. 12/686,245, filed Jan. 12, 2010; 14 pages.

Advisory Action dated Jun. 21, 2012; U.S. Appl. No. 12/686,245, filed Jan. 12, 2010; 3 pages.

Advisory Action dated Nov. 23, 2012; U.S. Appl. No. 12/686,244, filed Jan. 12, 2010; 7 pages.

Office Action dated Jan. 4, 2013; U.S. Appl. No. 12/686,244, filed Jan. 12, 2010; 22 pages.

Final Office Action dated Sep. 11, 2012; U.S. Appl. No. 12/686,244, filed Jan. 12, 2010; 26 pages.

Final Office Action dated Aug. 23, 2013; U.S. Appl. No. 12/686,244, filed Jan. 12, 2010; 24 pages.

* cited by examiner

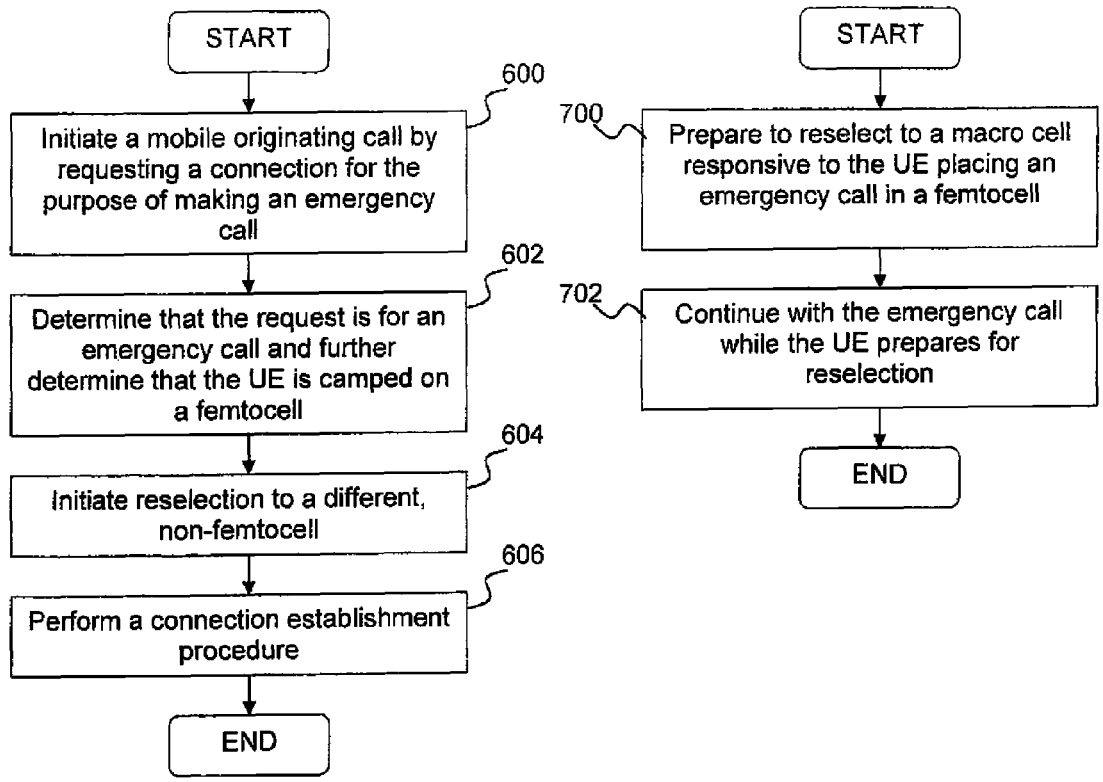

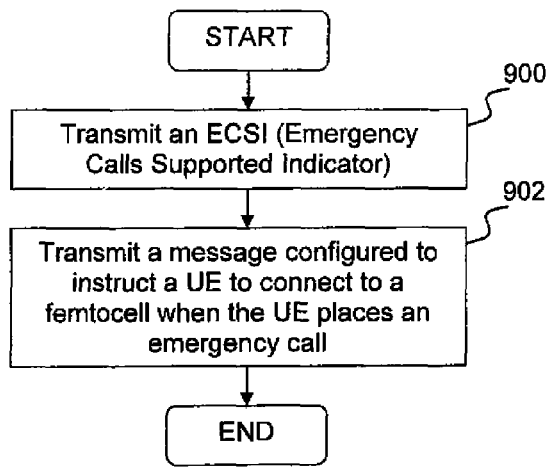
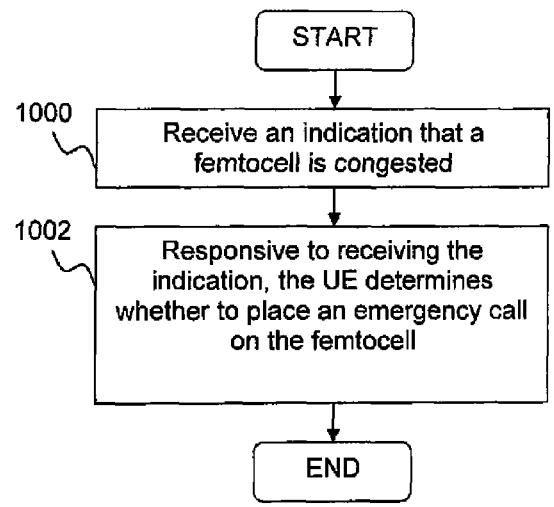
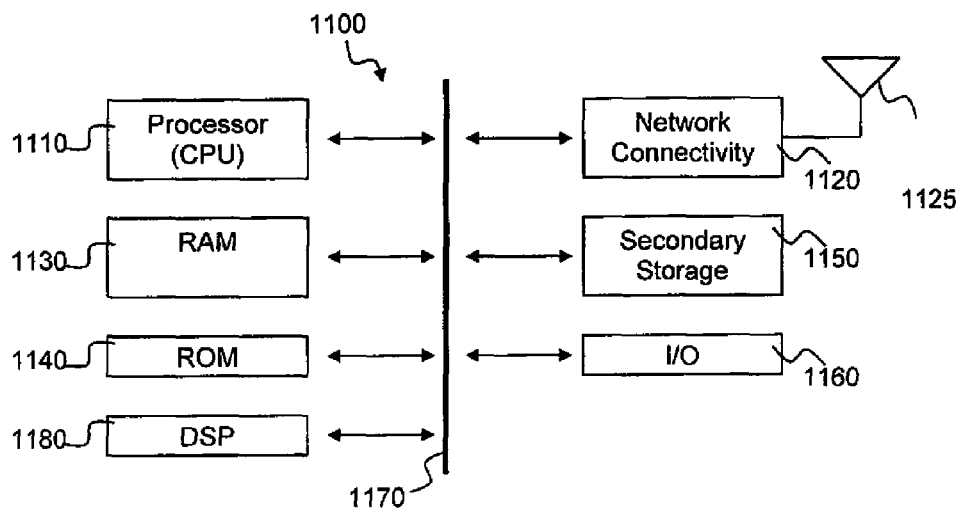

EMERGENCY SERVICES IN HOME CELLS SYSTEM AND METHOD

BACKGROUND

As used herein, the terms "user equipment" ("UE"), "mobile station" ("MS"), and "user agent" ("UA") might in some cases refer to mobile devices such as mobile telephones, personal digital assistants, handheld or laptop computers, and similar devices that have telecommunications capabilities. The terms "MS," "UE," "UA," user device," and "user node" may be used synonymously herein. A UE might include components that allow the UE to communicate with other devices, and might also include one or more associated removable memory modules, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long-Term Evolution (LTE) and LTE-Advanced (LTE-A). For example, an LTE or LTE-A systems and devices might include an Evolved Universal Terrestrial Radio Access Network (E-UTRAN) which may include an E-UTRAN node B (or eNB), a Home E-UTRAN node B (HeNB), a relay node, or a similar component rather than a traditional base station. These components may be referred to as an access node. Other components, for example in UTRAN, WLAN or WiMAX, that may be referred to as an access node, may include a node B (NB), Home node B (HNB) or a wireless access point. The term "(e)NB" may contemplate NBs and eNBs.

(e)NBs support emergency calls. H(e)NBs also might support emergency calls for both CSG and non-CSG members. H(e)NBs may provide very limited number of users with emergency services, relative to the capabilities of (e)NBs. Furthermore, the connection of an H(e)NB to an IP backhaul may be intentionally or unintentionally lost during other CSG or non-CSG members' emergency calls via the H(e)NB. Moreover, emergency services via an H(e)NB or via an (e)NB are desirably supported without difference in user experience.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 is a flowchart of a process of initiating an emergency call in a UE, according to an embodiment of the present disclosure.

FIG. 7 is a flowchart of a process of preparing to reselect to a macro cell, according to an embodiment of the present disclosure.

FIG. 8 is a flowchart of a process of indicating support for emergency calls, according to an embodiment of the present disclosure.

FIG. 9 is a flowchart of a process of indicating emergency call support, according to an embodiment of the present disclosure.

FIG. 10 is a flowchart of a process of determining whether to place an emergency call, according to an embodiment of the present disclosure.

FIG. 11 illustrates a processor and related components suitable for implementing the several embodiments of the present disclosure.

DETAILED DESCRIPTION

Figure 1:
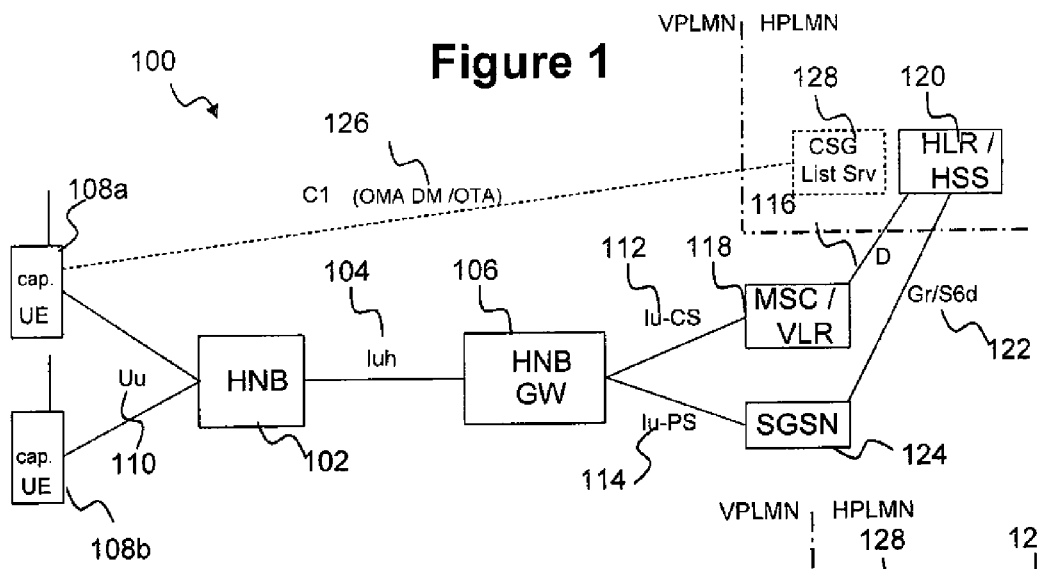
FIG. 1 is a block diagram showing a logical structure of an HNB access network, according to an embodiment of the present disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used throughout the specification, claims, and Figures, the following acronyms have the following definitions. Some of the terms identified below are defined by and follow the standards set forth by the Third Generation Partnership Program (3GPP) technical specifications. Where the 3GPP technical specifications use a term using the same acronym or words as those presented below, the 3GPP technical specifications describe the definition and functions of the corresponding term. However, the embodiments described herein use these components and/or functions according to inventive techniques described herein. Many but not all of the following terms are described in the 3GPP specifications.

"AS" is defined as "Access Stratum."
"APN" is defined as "Access Point Name."
"BSS" is defined as "Base Station Subsystem."
"CC" is defined as "Call Control."
"CGI" is defined as "Cell Global Identification."
"CM" is defined as "Connection Management."
"CN" is defined as "Core Network."
"CS" is defined as "Circuit Switched."
"CSG" is defined as "Closed Subscriber Group."
"CSR" is defined as "Circuit Switched Resource."
"DM" is defined as "Device Management."
"DSL" is defined as "Digital Subscriber Line."
"ECCN" is defined as "Explicit Cell Congestion Notification."

"ECRI" is defined as "Emergency Calls Required Indicator."

"ECSI" is defined as "Emergency Calls Supported Indicator."

"EDGE" is defined as "Enhanced Data rates for GSM Evolution."

"EF" is defined as "Elementary File."

"EHPLMN" is defined as "Equivalent Home Public Land Mobile Network."

"EMM" is defined as "EPS Mobility Management."

"eNB" is defined as "E-UTRAN Node B."

"EPC" is defined as "Evolved Packet Core."

"EPS" is defined as "Evolved Packet System."

"ESM" is defined as "EPS Session Management."

"E-UTRA" is defined as "Evolved Universal Terrestrial Radio Access."

"E-UTRAN" is defined as "E-UTRA Network."

"GA" is defined as "Generic Access."

"GERAN" is defined as "GSM EDGE Radio Access Network."

"GMM" is defined as "GPRS Mobility Management."

"GPRS" is defined as "General Packet Radio Service."

"GSM" is defined as "Global System for Mobile communications."

"HNB" is defined as "Home Node B."

"HNBAP" is defined as "Home Node B Application Protocol."

"HNB GW" is defined as "HNB Gateway."

"HeNB" is defined as "Home eNodeB."

"H(e)NB" is defined as a term that may include either or both of "Home eNodeB" or "HNB."

"HLR" is defined as "Home Location Register."

"HOSF" is defined as "Handover Selection Function."

"HPLMN" is defined as "Home Public Land Mobile Network."

"HLR" is defined as "Home Location Register."

"ID" is defined as "Identifier" or "Identification."

"IE" is defined as "Information Element."

"IMS" is defined as "Internet Protocol Multimedia Subsystem."

"IMSI" is defined as "International Mobile Subscriber Identity."

"IP" is defined as "Internet Protocol."

"LA" is defined as "Location Area."

"LAI" is defined as "Location Area Identity."

"LAU" is defined as "Location Area Update."

"LTE" is defined as "Long Term Evolution."

"MIB" is defined as "Master Information Block."

"MCC" is defined as "Mobile Country Code."

"MM" is defined as "Mobility Management."

"MME" is defined as "Mobility Management Entity."

"MNC" is defined as "Mobile Network Code."

"MO" is defined as "Management Object."

"MSC" is defined as "Mobile Switching Center."

"NAS" is defined as "Non Access Stratum."

"NNSF" is defined as "NAS Node Selection Function."

"OMA" is defined as "Open Mobile Alliance."

"OTA" is defined as "Over the Air."

"P-GW" is defined as "PDN Gateway."

"PCI" is defined as "Physical Cell Identity."

"PCRF" is defined as "Policy Charging Rule Function."

"PDN" is defined as "Packet Data Network."

"PDP" is defined as "Packet Data Protocol."

"PLMN" is defined as "Public Land Mobile Network."

"PS" is defined as "Packet Switched."

"PSAP" is defined as "Public Safety Answering Point."

"PSC" is defined as "Primary Scrambling Code."

"RA" is defined as "Routing Area."

"RAB" is defined as "Radio Access Bearer."

"RAT" is defined as "Radio Access Technology."

"RAU" is defined as "Routing Area Update."

"RNC" is defined as "Radio Network Controller."

"RPLMN" is defined as "Registered Public Land Mobile Network."

"RRC" is defined as "Radio Resource Control."

"RSRP" is defined as "Reference Signal Received Power."

"RSRQ" is defined as "Reference Signal Received Quality."

"S-GW" is defined as "Serving Gateway."

"SeGW" is defined as "Security Gateway."

"SI" is defined as "System Information."

"SIB" is defined as "System Information Block."

"SGSN" is defined as "Serving GPRS Support Node."

"SRVCC" is defined as "Single Radio Voice Call Continuity."

"TA" is defined as "Tracking Area."

"TAU" is defined as "Tracking Area Update."

"TS" is defined as "Technical Specification" or "Technical Specifications."

"UE" is defined as "User Equipment."

"USIM" is defined as "Universal Subscriber Identity Module."

"UTRAN" is defined as "Universal Terrestrial Radio Access Network."

"VANC" is defined as "VoLGA Access Network Controller."

"VLR" is defined as "Visited Location Register."

"VoIMS" is defined as "Voice over IMS."

"VoIP" is defined as "Voice over Internet Protocol."

"VoLGA" is defined as "Voice over LTE via Generic Access."

"WLAN" is defined as "Wireless Local Area Network."

As used herein, the following terms have the following definitions.

CSG Lists

An "allowed CSG list" is defined as the list stored in the UE containing the CSG identities and associated PLMN identities of the CSGs to which the subscriber belongs.

In the context of the description herein, this list may be from the AS perspective and may include one or more combinations of the NAS UE's allowed CSG list and operator CSG list, and potentially other types of CSG list defined for the NAS.

A "not allowed CSG" is defined as a CSG that is not in the allowed CSG list of the UE.

UE Attachment

As used herein, reference may be made to UE attachment to a cell or cells. The term "attachment" may be used, in a non-limiting example, to indicate the scenario of the UE performing a NAS attach procedure in idle mode, or in another non-limiting example to the scenario of establishing connected mode RRC connection on a cell. Also within the scope of the definition of "UE attachment" are other means of selecting a cell as the serving cell, such as one in which any connection, if required or desired, will be established and/or one in which a downlink paging channel is monitored, including any procedure associated with "camping on" a cell. The term "attach" may include the 3GPP meaning of "NAS attach", may include IMS attach, and may further include camping on a cell, selecting a cell, and other forms of attaching, camping, or connecting to a cell.

HNBs, H(e)NB, and Femtocells

The term "H(e)NB" may contemplate both HNBs, and HeNBs (Home eNodeBs). The term "HNB" may refer to on-premises customer equipment that connects a 3GPP UE over UTRAN wireless air interface to a mobile operator's network using a broadband IP backhaul. The term "H(e)NB" may refer to on-premises customer equipment that connects a 3GPP UE over E-UTRAN wireless air interface to a mobile operator's network using a broadband IP backhaul. Thus, in some embodiments, an HeNB may use the E-UTRAN radio access technology, while an HNB may use UTRAN radio access technology. Particular H(e)NBs and HNBs may have different access modes. The terms HeNB and HNB might be used to indicate that a particular cell generated by a HeNB or HNB may be a CSG cell or hybrid cell. Unless specified otherwise, the terms HeNB and HNB are used interchangeably herein, and both terms may be referred to by the term "H(e)NB."

The terms HNB cell, HeNB cell, and CSG cell may also be referred to as "femtocell." Thus, as used herein, the term "femtocell" may contemplate any of a HNB cell, HeNB cell, or CSG cell, and may also include femtocells. The term "femtocell" may be used outside of the 3GPP specifications to mean any cell with a very small coverage, typically though not necessarily installed in a private or corporate premises. The term "femtocell operator" may refer to the PLMN operator providing services through the H(e)NB hosting party, to a hosting party generally (a third party paid to operate the H(e)NB for a user), to the H(e)NB owner, or to combinations thereof.

Macro Cells

In contrast, the term "macro cell," while not necessarily having significance in 3GPP specifications, may be used to mean a cell other than a femtocell. As used throughout herein, a "macro cell" may be a cell known to support emergency services.

The following provide a few examples of the differences between macro cells and femtocells. First, the cell controller of an H(e)NB may be owned by a subscriber, rather than the PLMN operator, and may be located on a subscriber's premises. Second, connection from the home cell controller to the PLMN core network may be implemented by an connection substantially less reliable than used for macro cells. Third, such a connection may be via a subscriber's DSL connection or an IP connection not integral to the PLMN operator's network. Fourth, access to the femtocell may be restricted to a subset of users or devices; noting that the subscriber may be a private individual, a corporation, and educational establishment, or some other entity. Furthermore, femtocells may refer to concepts introduced for UMTS (UTRAN) and LTE (E-UTRAN) to improve indoor cell coverage and micro cell coverage, as well as to leverage wireline backhaul to the location chosen by the subscriber for H(e)NB coverage.

Access Modes in H(e)NBs

There may be multiple access modes for H(e)NBs. In one embodiment, three access modes are present in H(e)NBs: closed access mode, hybrid access mode and open access mode. In closed access mode, an H(e)NB may provide services only to its associated CSG members. In hybrid access mode, an H(e)NB may provide services to its associated CSG members and to non-CSG members. In open access mode, an H(e)NB may operate as a normal NodeB or eNodeB. Non-limiting examples of use cases of hybrid access mode and open access mode are presented below.

The following is an example of hybrid access mode. In order to improve the coverage in a shopping mall, H(e)NBs may be deployed. The shopping mall owner may have been provided a special deal by the network operator where the employees of the shopping mall will receive preferential charging rates and priority access when accessing services via these H(e)NBs. The shopping mall owner may allow the public to use the H(e)NBs to access the normal network operator services. The H(e)NB Hosting Party which has a contractual relationship with the operator related to the provision of access to the operator's network via one or more H(e)NBs for example a "lead" user in a household or the corporate IT manager in an enterprise, might not need to manage the public access and the public might not need to take special action in order to receive services on the H(e)NB.

The following is an example of open access mode. Open access mode may allow all users to use the H(e)NB. Open access mode may enhance coverage or capacity of an operator's public network. Open access mode H(e)NBs may be present, for example in railway stations, airports, stadiums, and other public locations.

Closed Subscriber Group (CSG)

An aspect of H(e)NB functionality may be the ability to restrict access to other H(e)NB functionality to particular users. For example, access may be limited to employees of the company on whose site the H(e)NB is deployed, to customers of a particular coffee shop chain, or, in the case of H(e)NBs deployed in private homes, to particular individuals.

To achieve this functionality, a CSG may be deployed. A CSG indicator may be used to indicate that the generated cell is a CSG cell by means of 1 bit broadcast in the system information. Additionally, a CSG cell may broadcast a CSG ID and a PLMN ID to which the CSG cell belongs, also in system information. However, a cell might indicate no CSG IDs, such as in the case of a macro cell or use of open access mode. Multiple cells may share a CSG ID. A UE may be subscribed to multiple CSGs. Such subscriptions may be temporary in nature. For a non-limiting example, a coffee shop might allow a customer 1 hour of access to the shop's CSG.

Attention is now turned to a non-limiting overview of the embodiments described herein. In particular, the embodiments described herein provide for techniques for addressing issues related to placing emergency calls in or near femtocells, as well as for addressing other issues. In one embodiment, reliability for emergency calls can be guaranteed by ensuring that, when the mobile device attempts to establish an emergency call while camped on or in an active connection in a femtocell, the device first reselects to macro coverage within the coverage area and then establishes the call on the macro cell. In a second embodiment, in situations where the UE attempts the emergency call over the femtocell, the UE prepares to reselect to a macro network in case the call is dropped in the femtocell. In a third embodiment, emergency services (for example, the possibility to establish a connection for the purpose of making an emergency call) might be provided, but an indication is provided to the UE that reliability of those services is not guaranteed or that those services are substantially less reliable than the equivalent services when provided by another cell or network. In a fourth embodiment, in the event of femtocell congestion, the UE may be capable of reselecting to a macro cell without needing to be handed over by the network, and the UE may be made aware of existing cell congestion. These and other embodiments are described further below.

FIG. 1 is a block diagram showing a logical structure of an HNB access network, according to an embodiment of the present disclosure. In particular, FIG. 1 describes the architecture for HNB CSG cells. Before describing this architecture, attention is first drawn to the concepts of HNBs and H(e)NBs, CSGs, and access modes in H(e)NBs.

Returning to FIG. 1, architecture 100 shows an exemplary architecture of an HNB access network. The HNB 102 may provide RAN connectivity using the Iuh interface 104. The HNB 102 may support the NB and most of the RNC functions and also HNB authentication, HNB GW 106 discovery, HNB registration and UE 108a, 108b registration over the Iuh interface 104. The HNB 102 may secure the communication to and from the HNB GW 106.

The HNB GW 106 may serve the purpose of a RNC presenting itself to the CN as a concentrator of HNB connections. The HNB GW 106 may provide a concentration function for the control plane and may provide concentration function for the user plane. The HNB GW 106 may support a NNSF.

In the architecture 100 shown in FIG. 1, various reference points are shown. The Uu interface 110 may be the standard Uu interface between UEs, 108a and 108b, and the HNB 102. The Iuh interface 104 may be the interface between the HNB 102 and the HNB GW 106. For the control plane, the Iuh interface 104 may use HNBAP protocol to support HNB registration, UE registration and error handling functions. For the user plane, the Iuh interface 104 may support user plane transport bearer handling.

The Iu-CS 112 interface may be the standard interface between the HNB GW 106 and the CS core network. The Iu-PS interface 114 may be the standard interface between the HNB GW and the PS core network. The D interface 116 may be the standard D interface between the MC/VLR 118 and HLR/HSS 120. The Gr interface 122 may be the Standard Gr interface between the SGSN 124 and HLR/HSS 120. The C1 interface 126 may be an optional interface between the CSG List Srv 128 and CSG-capable UE 108a. OTA communications may be used to update the allowed CSG list on a UE with a Release 8 USIM. OMA DM may be used to update the allowed CSG list on a UE with a pre-Release 8 USIM.

The architecture 100 shown in FIG. 1 may have one or more of several mechanisms. All Rel-8 UEs and post Rel-8 UEs supporting CSG functionality may or shall maintain a list of allowed CSG identities. This list may be empty in case the UE does not belong to, or is not subscribed to, any CSG.

Each cell of an H(e)NB might, in one embodiment, belong to (i.e. be associated with, and hence permit access to subscribers of) a maximum of one CSG. It may or shall be possible for cells of an H(e)NB to belong to different CSGs, and hence have different CSG IDs.

The Allowed CSG List may or shall be provided as part of the CSG subscriber's subscription data to the MME. The Allowed CSG List may be updated in the UE according to the result of attach, TAU, service request, and detach procedures or by application level mechanisms such as OMA DM procedures.

In an embodiment, the MME may or shall perform access control for the UEs accessing through femtocells during attach, combined attach, detach, service request, and TAU procedures. The UE may or shall be notified of the cause of rejection by the network, if the UE is not allowed to access a femtocell.

In an embodiment, when a CSG ID which is not included in the UE's Allowed CSG List is manually selected by the user, a TAU procedure via the selected femtocell may or shall be triggered immediately by the UE. This TAU procedure may allow the MME to perform CSG access control.

In an embodiment, a TAI list may also apply for femtocells. The TAI list may include TAIs related to femtocells and TAIs related to non-femtocells. The UE might not differentiate these TAIs in the TAI list. For the case of H(e)NB GW deployment, TAIs supported in the H(e)NB GW may be the aggregation of TAIs supported by the femtocells under the H(e)NB GW.

Figure 2:
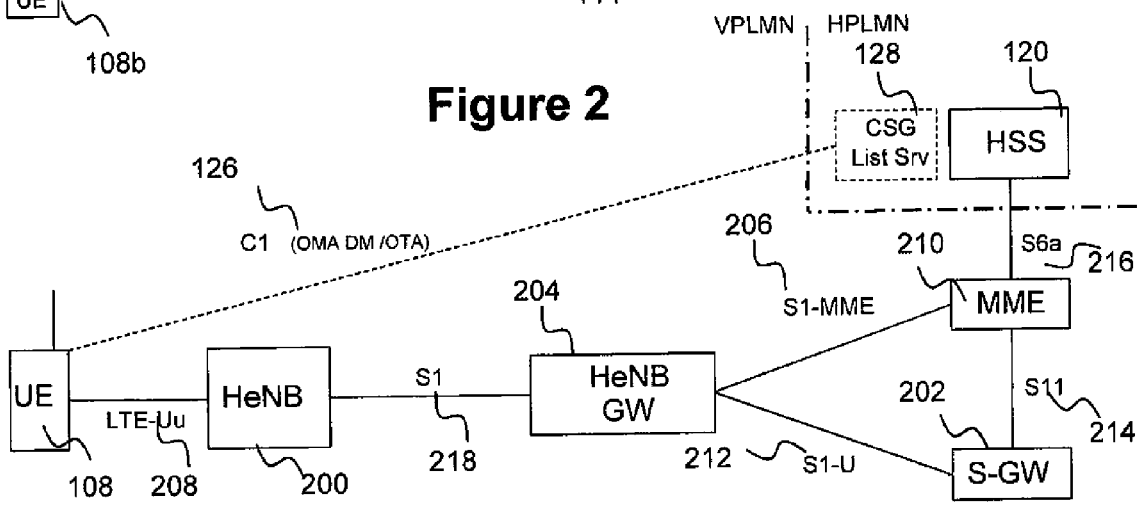
FIG. 2 is a block diagram showing a logical structure of an H(e)NB access network with a dedicated gateway, according to an embodiment of the present disclosure.
Figure 3:
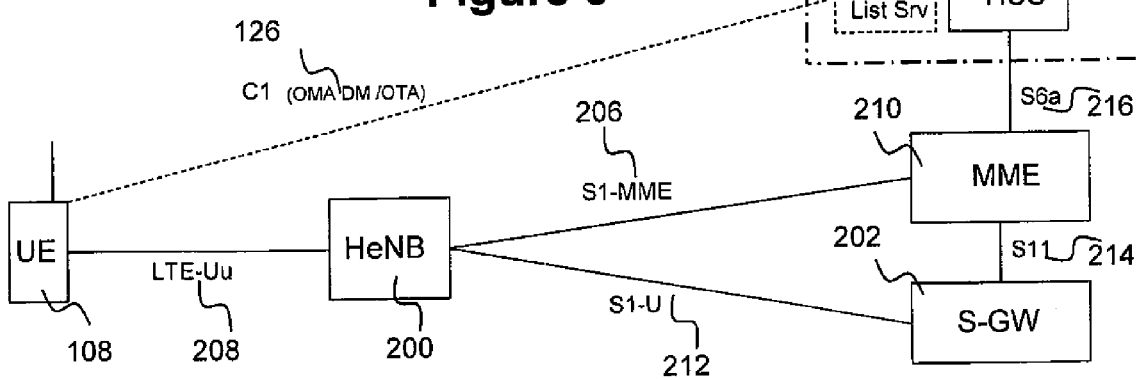
FIG. 3 is a block diagram showing a logical structure of an H(e)NB access network without a dedicated gateway, according to an embodiment of the present disclosure.
Figure 4:
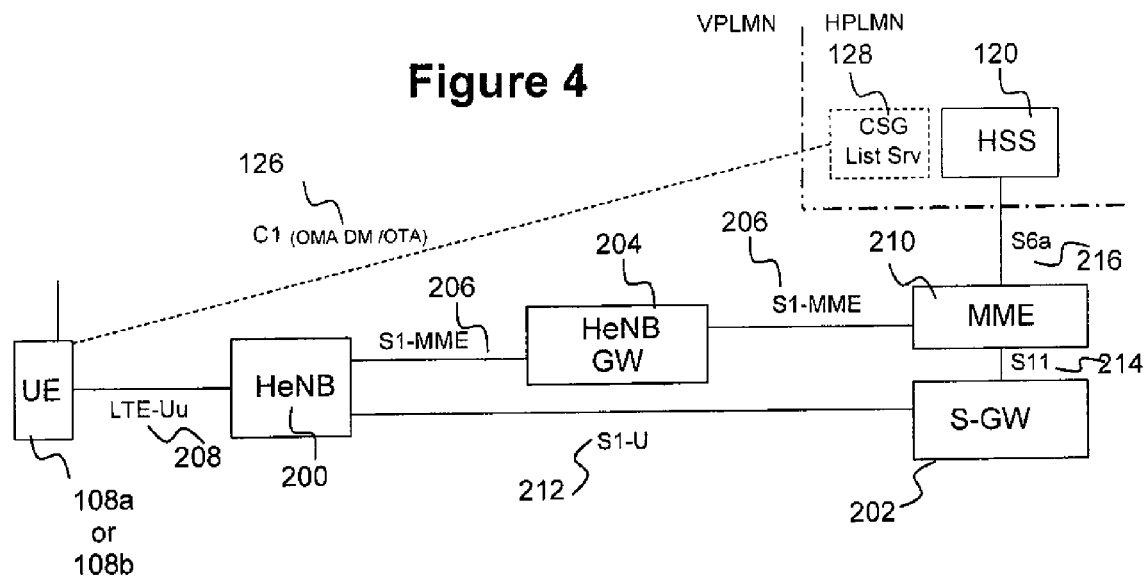
FIG. 4 is a block diagram showing a logical structure of an H(e)NB access network with a gateway for C-Plane, according to an embodiment of the present disclosure.

FIGS. 2, 3, and 4 describe variants of the architecture for H(e)NB femtocells, relative to the HNB architecture 100 for femtocells shown in FIG. 1. In particular, FIG. 2 is a block diagram showing a logical structure of an HNB access network with a dedicated gateway, according to an embodiment of the present disclosure. FIG. 3 is a block diagram showing a logical structure of an HNB access network without a dedicated gateway, according to an embodiment of the present disclosure. FIG. 4 is a block diagram showing a logical structure of an HNB access network with a gateway for C-Plane, according to an embodiment of the present disclosure. In the embodiments shown in FIG. 1 through FIG. 4, reference numerals that correspond to each other correspond to similar devices or objects, and may operate similarly.

In FIG. 2 through FIG. 4, the functions supported by the H(e)NB 200 may or shall be the same as those supported by an eNB, with the possible exception of a NNSF. The procedures that are run between an H(e)NB 200 and the EPC may or shall be the same as those between an eNB and the EPC. The UEs, 108a or 108b, might be either UMTS capable or E-UTRAN capable, or both, depending on implementation. UEs may be either CSG capable or non-CSG capable, depending on implementation.

The H(e)NB GW 204 may serve as a concentrator for the C-Plane, specifically the S1-MME interface 206. The H(e)NB GW 204 may optionally terminate the user plane towards the H(e)NB 200 and towards the S-GW 202, and may provide a relay function for relaying User Plane data between the H(e)NB 200 and the S-GW 202. The H(e)NB GW 204 may support a NNSF.

Reference points are now described. The LTE-Uu interface 208 may be a standard LTE-Uu interface between the UE 108 and the H(e)NB 200. The S1-MME 206 interface may be defined between H(e)NB 200 and a MME 210 if no H(e)NB GW 204 is used. If H(e)NB GW 204 is present, it may or shall use a standard S1-MME interface 206 towards both the H(e)NB 200 and MME 210.

The S1-U interface 212 data plane may be defined between the H(e)NB 200, H(e)NB GW 204 and the SeGW. The S1-U interface 212 from the H(e)NB 200 may be terminated at the H(e)NB GW 204, or a direct logical U-Plane connection between H(e)NB and S-GW 202 may be used.

The S11 interface 214 may be a standard interface between the MME 210 and the S-GW 202. The S6a 216 interface may be standard interface between MME 210 and the HSS 120. The S1 interface 218 may be a standard interface between H(e)NB 200 and H(e)NB GW 204.

Legacy Devices

UMTS femtocells might not be listed in the neighbour cell lists of non-femtocells. Therefore, legacy UMTS devices, which may be Release 7 or earlier devices, might not search for such cells. Should a legacy device attempt to access a femtocell, the registration attempt may be rejected.

E-UTRAN is specified first in Release 8. For this reason, all E-UTRAN capable devices may be "CSG-aware" devices, even if they have no CSG subscription.

Idle Mode Mobility to and from Femtocells.

Generally, network operators may desire that devices which have a subscription to a femtocell camp on that cell in preference to a non-femtocell. However, the determination by the device to search for femtocells may be implementation-specific, and may be manually triggered. Devices may store some information corresponding to the location of cells which they are able to access. Examples of this information include GPS coordinates or a list of macro cells which are detected. This information may be used to speed up subsequent network accesses. Storing this kind of information may be referred to as fingerprinting.

The decision of which cell to camp on also may be dependent on the cell selection and reselection rule defined for UTRAN and E-UTRAN. In Release 8, a UE might reselect to a cell only if it is the best cell of any cells using its particular carrier frequency. The best cell might be considered the cell with the strongest signal strength. A femtocell need not be the best cell for a particular frequency. While the UE is camped on a suitable femtocell, the UE may or shall always consider the current frequency to be the highest priority frequency. Idle mode reselection away from femtocells towards a non-femtocell may follow legacy behaviour for reselection to such cells.

Connected Mode Mobility to and from Femtocells

Concerning mobility between a macro eNB and an H(e)NB, and between H(e)NBs, possibly only outbound mobility is supported in Release 8. Outbound mobility may be a handover of a UE from an H(e)NB to a macro eNB. In Release 9, one of the enhancements may support inbound mobility. Inbound mobility may be a handover of a UE from a macro eNB to an H(e)NB.

Hybrid Cells

Hybrid cells, introduced in Release 9, may be cells that belong to a CSG and have a CSG ID. However, a hybrid cell may allow access to both its CSG members and non-CSG members. Non-CSG members may be UEs that are not subscribed to the CSG to which the hybrid cell belongs. In Release 8, a hybrid cell may be identified by a CSG ID, which it broadcasts, and by setting the CSG Indicator bit (E-UTRAN) or CSG Indication bit (UMTS) to a value that corresponds to a non-femtocell. The CSG indication bit may also be sent by broadcast signaling.

"PCI/PSC Split"

In E-UTRAN, neighbour cell lists might not be explicit. In other words, the neighbour cell lists need not positively identify neighbour cells. Rather, the neighbour cell lists may indicate a frequency and, optionally, a list of "not allowed" or blacklisted cells that mobiles should not attempt to access. UEs may be expected to detect cells on a frequency by blind searching. However, blind searching may lead to difficulties in the case where many of the detected cells are femtocells. In order to minimize unnecessary processing of such cells by devices which have no CSG subscription, the network may optionally indicate the PCI split applicable to femtocells, that is, the set of physical cell identities that are reserved for femtocells. A PSC split may be the analogous indication for UMTS cells, in case an operator does list femtocells in the neighbour cell list. Possibly, a PCI/PSC split may be used to distinguish between hybrid cells and non-hybrid cells.

Measurement Object and Measurement Identity

In UTRAN and E-UTRAN, measurement objects and measurement identities may be configured by the eNB for a UE to trigger measurement reporting from the UE. A measurement object may be associated with a particular carrier frequency. This particular carrier frequency may be the same frequency as the serving cell, or a different frequency for the case of inter-frequency measurement. The eNB may configure one or more measurement objects for a UE.

To trigger measurement reporting from a UE, the eNB may configure one or more measurement identities for a UE. Each measurement identity may be associated with a measurement object and a reporting configuration. A reporting configuration may define the criteria, such as RSRP and/or RSRQ thresholds, upon which the measurement reporting from the UE is triggered.

Priority-Based Reselection Algorithm

As part of the introduction of E-UTRAN, a reselection algorithm may be specified to allow operators greater flexibility over the relative priorities of different cells for individual users, when considering preferences among different cells which are candidates for autonomous reselection. This algorithm may apply to E-UTRAN, UTRAN, and GERAN networks, and possibly other networks. This reselection algorithm might not apply when considering reselection to femtocells. The priority-based reselection algorithm may specify, for a UE which is permitted to perform autonomous reselection and is currently camped on a cell from one group, whether the mobile should reselect to a cell of a different group.

For UTRAN and E-UTRAN, cells may be grouped according to their operating type, such as either frequency division duplexing (FDD) or time division duplexing (TDD), and operating frequency. For example, all TDD cells with a centre frequency of 2.152 GHz may be considered in one group. In another example, all GERAN cells may be considered in one group.

Each group of cells may be either assigned a priority level or may not be assigned any priority level. In normal operation, a mobile might not consider for reselection any cell which is not assigned a priority level. For normal operation, a requirement might be that the mobile is aware of the priority level of the cell in which it is currently camped. Two groups of cells which operate using different technologies, such as GERAN, UTRAN, or E-UTRAN, might not be assigned the same priority level.

Metrics for evaluating a quantity "S" applicable to both the serving cell ("S_serving") and reselection candidate cells ("S_tgt") may be specified. These metrics may be specific to the RAT type. A threshold for the serving cell may be specified, such as Thresh_serving. Two thresholds may be specified for a group of target cells according to whether they have a higher priority than the serving cell, Thresh_tgt(high), or a lower priority than the serving cell, Thresh_tgt(low). Reselection may be performed if (1) for a target cell which has a higher priority than the serving cell, S_tgt>Thresh_tgt(high); or (2) for a cell which has a lower priority than the serving cell, S_serving<Thresh_serving AND S_tgt>Thresh_tgt (low).

Additional Terminology

The following two terms might not be specific to CSG mobility. "Handover Preparation" may be a network-side procedure including a request by the serving (source) cell to the target cell to allocate resources for the UE. "SI acquisition" may be reception and decoding of broadcast system information in a cell. SI acquisition may be used to obtain, for example, the Handover Preparation information.

The following three terms may be specific to CSG mobility. A "Preliminary Access Check" may be a process of determining whether a UE is allowed to access a femtocell by checking CSG membership. In other words, a Preliminary Access Check may be used to determine whether the CSG ID of the cell is in the UE's Allowed CSG List. A "Handover Evaluation" may be a process of acquiring a cell global ID and performing a Preliminary Access Check, with both processes performed at the UE. The third term, "Handover Preparation Information," may refer to the information obtained by the Preliminary Access Check, plus the cell global identity (CGI) and the TAI.

Figure 5:
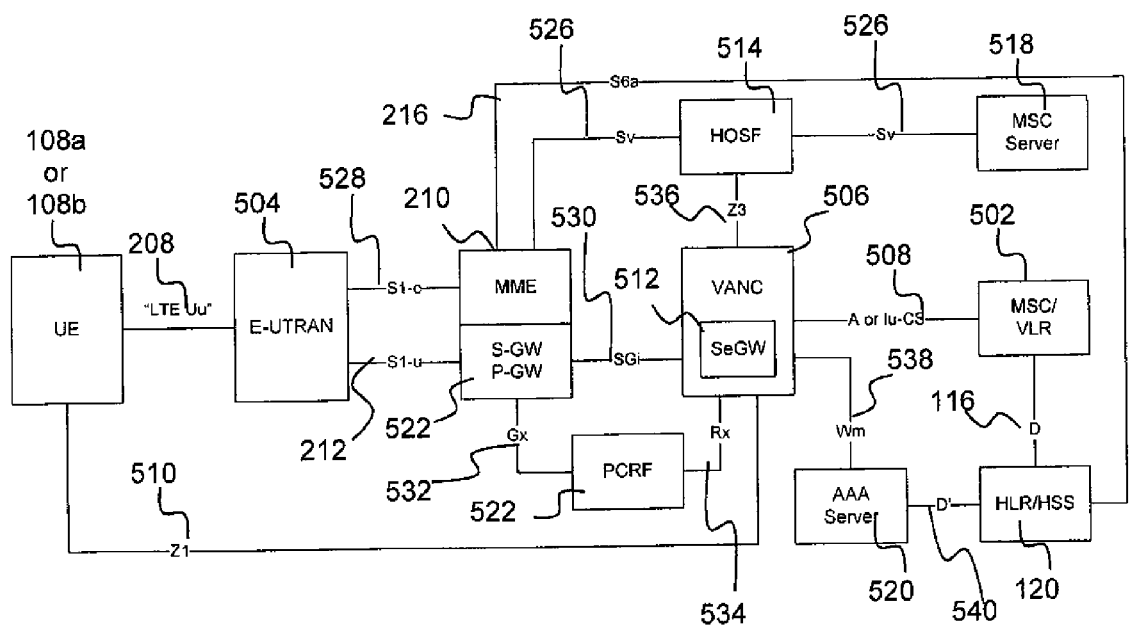
FIG. 5 is a block diagram of a non-roaming architecture, according to an embodiment of the present disclosure.

FIG. 5 is a block diagram of a non-roaming architecture, according to an embodiment of the present disclosure. In particular, the non-roaming architecture shown in FIG. 5 may be used to implement VoLGA. VoLGA may be considered devices and software for implementing voice services for a UE 108a or 108b over LTE via generic access (note that LTE may be E-UTRAN). Certain reference numerals in FIG. 5 are common to one or more of FIG. 1 through FIG. 4; such common reference numerals refer to similar objects and may have similar functionality. However, in the embodiment shown in FIG. 5, UE 108a or 108b may also support the VoLGA protocol stack.

In VoLGA, the operator may reuse the existing CS domain entities, such as the MSC/VLR 502, that control establishment of CS services under E-UTRAN coverage established by the E-UTRAN 504. The VANC 506 may enable the UE 108a or 108b to access the MSC/VLR 502 using the generic IP connectivity provided by the EPS. The VANC 506 may be connected to the MSC/VLR 502 using either the A-interface ("VoLGA A-mode") or the Iu-CS interface ("VOLGA Iu-mode"). Either interface is shown at 508. From the EPS point of view, the VANC 506 is viewed as an Application Function and the "Z1" interface 510 between the UE 108a or 108b and the VANC 506 may be based on the "Up" interface defined in 3GPP TS 43.318.

Basic Functionality

The VANC 506 may behave like a BSS in VoLGA A-mode, or may be have like an RNC in VoLGA Iu-mode, towards the CS core network. The VANC 506 may include a SeGW 512 that may terminate a secure remote access tunnel from each UE 108a or 108b. The SeGW 512 may provide mutual authentication, encryption, and integrity protection for signaling traffic. Some functions provided by the VANC 506 are provided below.

The VANC 506 may support the UE-VANC protocol. The UE-VANC protocol may be used for encapsulation of NAS CS domain signaling messages, for paging, and for the VoLGA Registration procedure to provide the UE with CN parameters that are normally broadcast in System Information. The VANC 506 may support the VANC-UE binding creation and deletion procedures with the HOSF. Furthermore, the VANC 506 may support the detection of an emergency call being set up.

In case of handover, the HOSE 514 may decide if the handover request from the MME 210 may be for VoLGA or for IMS/SRVCC. The HOSF may also route the request accordingly, such as either to the serving VANC 506 or to the MSC Server 518 enhanced for SRVCC. The HOSF 514 may support the VANC-UE binding creation and deletion procedures so that the HOSF 514 can make these decisions based on the stored record of the serving VANC 506 for the UE 108a or 108b. The HOSF 514 may be a logical functional entity which may be deployed according to operators requirements. For example, the 514 may be deployed as a separate entity, or may be embedded in the MME 210 or VANC 506.

Certain functionalities for the UE 108a or 108b may be required or desired to support VoLGA. Examples of these functionalities include discovery of and registration with the VANC 506, CS related NAS procedures for MM and CM through the VANC 506, and VoIP on the user plane.

Emergency Services in VoLGA

For a UE with a valid USIM that is obtaining normal service in a PLMN, emergency services can, based on operator preference, be supported either by VoLGA in E-UTRAN or via the CS domain in GERAN/UTRAN. The VANC 506 may indicate, in the VoLGA registration procedures, an access network preference for the placement of emergency calls. The VANC 506 may ensure that the MSC 502 receives a proper Cell Global ID (CGI) for routing of the emergency call to an appropriate PSAP.

If the access network preference is GERAN or UTRAN, and if GERAN or UTRAN coverage is available either from the VoLGA subscriber's home PLMN or from any roamed to PLMN, then the UE may or shall autonomously switch from VoLGA mode to GERAN or UTRAN mode and place the emergency call over GERAN or UTRAN. After completion of the emergency call the UE may stay in GERAN or UTRAN for a specific amount of time to leverage the location determination infrastructure in GERAN or UTRAN for call-back. However, this behavior need not be VoLGA specific.

If the access network preference is E-UTRAN, and if E-UTRAN coverage is available either from the VoLGA subscriber's home PLMN or from any roamed to PLMN, then the UE may place the emergency call over VoLGA via the MSC. The VANC 506 may detect that an emergency call is being set up based on one or more of several factors. Examples of these factors include the Establishment Cause IE in the GA-CSR/RRC Request message, and/or the priority value included in the Assignment Request or RAB Assignment Request message. The use of the priority value to detect an emergency call may be based on operator configuration.

A VoLGA UE 108a or 108b which is CS voice capable, in limited service state, may or should always camp on a RAT which is likely to support the CS domain, such as GERAN or UTRAN as specified in TS 23.221. Such a UE may place an emergency call in the GERAN or UTRAN CS domain.

Several other components of a VoLGA system are shown in FIG. 5 and are described in the 3GPP TS. These include HLR/HSS 120, AAA server 520, PCRF 522, and S-GW/P-GW 524. Additional interfaces are shown in FIG. 5 and are described in the 3GPP TS. These interfaces include the Sv interface 526, the S1-C interface 528, the S1-u interface 212, the LTE Uu interface 208, the SGi interface 530, the Gx interface 532, the Rx interface 534, the Z3 interface 536, the Wm interface 538, the D interface 116, and the D' interface 540.

Attention is now turned to describing various issues regarding the handling of emergency calls, whether when using VoLGA or some other system. There are at least five different issues. A first issue is network reliability. A second issue is a potentially slow cell reselection process. A third issue is support of emergency services and potential liability for failing to maintain a reliable network during an emergency call. A fourth issue is cell congestion. A fifth issue is support of emergency calls in VoLGA over E-UTRAN femtocells. Other issues may also exist. Each of these issues is described in turn.

Reliability in the Support of Emergency Services

The first issue that may arise in the context of supporting emergency calls is reliability of the network, especially when using H(e)NBs. These devices should support emergency calls. However, these devices may have reliability issues compared with non-H(e)NB cells. Nevertheless, the reliability of emergency calls should not be reduced by the deployment of femtocells.

The 3GPP TS 22.011 (Release 8) and TS 22.101 (Release 9) specifications state that H(e)NBs shall support emergency calls for both CSG and non-CSG members (TS 22.011, sub-clause 8.5.1 provides that, "HNB/HeNB shall support emergency calls for both CSG and non CSG members.") In addition in Release 9, subject to availability of network resources, there shall be no difference in user experience when using the PLMN provided services via an H(e)NB or via an NB/eNB, Note that (unlike for other cells) these resources may not be under the control of the network operator.

H(e)NBs might not be able to support all emergency calls from CSG or non-CSG members because of limited resources or may not provide sufficient reliability. However, when the UE is camping on a femtocell, a mechanism should exist to reliably support emergency calls.

When considering the support of voice calls in a femtocell, two types of resources may be considered, the resources over the radio link and the resources in the wireline network connecting the femtocell to the operator core network. The resources in the wireline network to be supported might be the Iuh and S1 interfaces in the architecture. Support for these resources might be by means of a DSL link or a similar connection. Furthermore, a femtocell may be connected to the operator core network through an HNB GW.

Several points of failure may exist for an emergency call established in a femtocell that may be of lesser importance for calls using macro cells. For example, power to a femtocell could be cut, such as by the user accidentally tripping on a power cable providing power to an H(e)NB, or by turning off an H(e)NB at the end of the business day. In another example, a DSL connection supporting an H(e)NB connection may be lost, such as when the Iuh and S2 interfaces are transported between the user home and the operator network where the H(e)NB GW resides. Other issues unique to H(e)NBs/HNBs may also exist.

Avoiding low reliability of emergency calls when femtocells are deployed is desirable, particularly for a UE which is camping in a femtocell. Ensuring that an emergency call established by such a UE has the appropriate reliability is also desirable.

Slow Reselection Process

The second issue introduced above may be a potentially slow cell reselection process. A UE connected in a femtocell and involved in an emergency call, or camped in a femtocell and attempting an emergency call, might need to reselect to another cell. Reselection may be desired or necessary because the femtocell may not support the emergency call, either temporarily or permanently. If the cell does not support the emergency call, the UE may perform reselection to another femtocell using the same or different RAT, or may perform reselection to a macro cell. As part of the reselection process, the UE may perform scanning for available cells.

The reselection process may be undesirably time consuming. A considerable amount of time may be used before the UE can establish or re-establish an emergency call over the new cell, or before the UE is reachable for a call back from the PSAP.

Support of Emergency Services and Liability

The third issue mentioned above relates to liability. Each region, country, and/or jurisdiction may have its own rules and regulations regarding the reliability of emergency calls. When users perform emergency calls by means of a macro cell, the operator of the macro cell might be responsible for ensuring that emergency calls are delivered. In other words, the operator might be required by law to guarantee a certain degree of reliability. The operator may be legally liable for failing to connect or sustain an emergency call.

An operator may limit or manage its risk in this regard because the operator owns and controls not only the base stations, but also the radio access network and the core network. When the base stations, the radio access network, and the core network are owned by another party, such as a third party operator, an agreement may exist between the providing operator and the third party operator regarding which party assumes liability for a failed or dropped emergency call.

With the introduction of H(e)NBs, these situations may change. For example, H(e)NBs may be located in the user's home. In another example, the H(e)NB may be located at an enterprise or on a campus. In either case, the femtocell operator may deploy the H(e)NB to improve the coverage or to provide value added services, such as local IP access, within the coverage. These individuals or organizations may not wish to assume liability for emergency calls.

The issue of liability for emergency calls may be exacerbated as a result of the fact that emergency calls established through an H(e)NB might fail for reasons that are difficult for a femtocell operator to control. One scenario that may be problematic is when the call fails because the owner of the premises where the H(e)NB is located is not aware of an ongoing emergency call, but switches off the power to the H(e)NB either unknowingly or accidentally. Another scenario may occur when the H(e)NB connectivity to the operator core network is interrupted because of a failure in the premises IP connectivity, which is a factor that the H(e)NB operator might not be able to control.

In scenarios such as those described above, determining which individual or organization is liable for a failed or dropped emergency call may be difficult. The operator may have limited control of how the home or enterprise network is operated, whether there are limited hours of operation, the reliability of power or backhaul, etc. The owner of the premises where the H(e)NB is located may not want to be liable for failed emergency calls.

Femtocell Congestion

The fourth issue introduced above is the possibility of femtocell congestion. In certain scenarios, reliability of emergency calls might not be guaranteed because the femtocell may be congested. Congestion may arise due to one or more factors, including but not limited to radio conditions, the number of current users, and the amount of data being transferred by the users.

Normally a UE may have little or no information on whether a radio cell is congested or not. In the case of femtocells, the congestion may be caused by non-radio conditions, such as congestion over the network link between the femtocell and the operator core network. Therefore, the UE may have no way of deciding whether the UE should attempt an emergency call over the femtocell.

Support of Emergency Calls in VoLGA Over E-UTRAN Femtocells

The fifth issue introduced above is support of emergency calls in VoLGA over E-UTRAN femtocells. VoLGA standards describe how a UE may behave for emergency calls when the UE is connected to a macro E-UTRAN cell. However, the VoLGA specifications do not address the issues related to the support of VOLGA emergency calls over femtocells and do not address the problems described above.

Several Embodiments for Addressing the Above Issues

The embodiments described herein provide for techniques for addressing the issues described above, as well as for addressing other issues. In one embodiment, reliability for emergency calls may be guaranteed by ensuring that, when the mobile device attempts to establish an emergency call while camped or in an active connection in a femtocell, the device first reselects to macro coverage within the coverage area and then establishes the call on the macro cell. This technique may be referred to as bypassing a femtocell. This technique may address any of the above issues.

In a second embodiment, in situations where the UE attempts the emergency call over the femtocell, the UE may prepare to reselect to macro coverage in case the call is dropped in the femtocell. Additionally, this technique may be used in conjunction with other embodiments described herein.

In a third embodiment, emergency services might be provided, but an indication may be provided that reliability of those services is not guaranteed. For example, an Emergency Calls Supported Indicator (ECSI) may be sent by the network to the UE indicating the type of emergency services supported. In turn, an Emergency Calls Required Indicator (ECRI) may be sent by the UE to the network, indicating the type of emergency services requested by the UE. The network may indicate support of limited emergency services by providing to the UE the ECSI with a value indicating that only limited emergency services are supported. The UE may require a specific set of emergency services by providing an ECRI to the network. The owner of the femtocell may decide to set the ECSI to indicate that only limited emergency services are supported if, for example, the owner does not want to assume liability in case of failure of emergency calls established over the femtocell. This embodiment addresses the third problem described above, though this embodiment may also be used with other embodiments described herein to address other issues described above.

In a fourth embodiment, in the event of femtocell congestion, the UE may be capable of reselecting to a macro cell without needing to be handed over by the network. The UE may be in either in idle mode or active mode. This embodiment provides for a set of mechanisms for the UE to be aware of the femtocell congestion, as described further below. This embodiment addresses the fourth issue described above, but may also be used with the other embodiments described herein to address other issues described above.

The following paragraphs describe detailed embodiments and variations for the four embodiments described above. Each of the above four embodiments are addressed individually below.

I. Bypassing an H(e)NB in Favor of a Macro Cell

Attention now is turned to the embodiment mentioned above wherein, when making an emergency call, a UE will attempt to connect to a macro cell directly even if femtocells or other micro/femtocells are available. This technique may guarantee reliability for emergency calls by ensuring that, when the mobile device attempts to establish an emergency call in a femtocell, the UE first reselects to a macro cell within the coverage area and then establishes the call. Most of the behaviours in this embodiment may be at an AS-level, rather than at the NAS level. Reselection may be in the RRC protocol layer, and the RRC protocol may know that a call is being set up for emergency purposes. For this reason, the NAS need not be made aware of the techniques described herein, but may be made aware in other embodiments.

Case 1 for bypassing an H(e)NB in favor of a macro cell: Applicable to a UE camped in UTRAN HNB in states where autonomous reselection is permitted The following steps may be taken in order to implement the bypassing of a femtocell in favor of a macro cell, for the case of a UE camped in an UTRAN H(e)NB in states where autonomous reselection is permitted. First, the CC entity may initiate a Mobile Originating Call. As a result of this call, the MM layer in the UE may pass this request to the RRC layer and may request an RRC connection for the purposes of making an emergency call, if an RRC connection is not currently available. In any case, the RRC layer may be made aware that an emergency call is to be initiated by the device.

In a second step, the RRC layer may determine that, first, the request is for an emergency, and second, that the UE is currently camped in an HNB cell. The fact that the UE is camped in an HNB cell may be indicated by the CSG Indication, which may be sent in an SIB1 of the current serving cell.

In an optional first additional step, the UE may indicate to the serving cell that it is performing cell reselection, and may further indicate that the purpose of the cell reselection is to establish an emergency call. The UE may further provide the identity or identifying characteristics of the selected target cell. In an optional second further step, possibly dependent on the first additional step, the UE may receive one or more of a target cell indicated by the serving H(e)NB and system information applicable to a target cell. In this approach, the network may be informed of the reason for cell reselection.

In a third step, the RRC layer may initiate reselection to an alternative, non-H(e)NB cell, which may be a macro cell. In a fourth step, the RRC layer may perform RRC Connection establishment for the purposes of initiating the emergency call. The RRC Connection establishment may possibly be performed in conjunction with other mobility management procedures, such as but not limited to LAU or RAU procedures.

For the process described above, the distinction and functionality split between MM, CC, and/or RRC layers may be specified according to convenience. The distinction and functionality of the split need not be required in any given implementation, either in the existing TS or with respect to the embodiments described herein. In an embodiment, this notice may be applicable to all embodiments referencing protocol layers.

In another embodiment of the process described above, with respect to the third step, the cell reselection process may be performed according to a priority-based cell reselection algorithm. One illustrative reselection may be as follows. The signal quality of the serving cell may be considered to be below the applicable threshold. Thus, S_serving may be less than Thresh_serving, regardless of the actual value of S_serving. Furthermore, or alternatively, in case the serving cell is known to be on a frequency dedicated to HNB cells, the UE might not perform intra-frequency reselection, but rather behave as if the UE has no priority assigned for that frequency or for other frequencies known to be used only by femtocells. In any case, the UE may make use of any PCI/PSC split information the UE has stored to avoid performing cell reselection to a femtocell, whether using intra-frequency or inter-frequency cell reselection.

The approach described above may result in minimal complexity increase, in case the priority-based reselection algorithm is implemented. Furthermore, this approach may maximize the possibility that the UE will perform reselection to a cell which has strong signal quality and also is not another femtocell.

The third step described above might further require reselection to a cell belonging to a different PLMN, such as in the case where the only cells available for the serving PLMN are femtocells. In this case, the PLMN selection rules provided by 3GPP TS 23.122 and 3GPP TS 22.011 may apply.

Case 2 for bypassing an H(e)NB in favor of a macro cell: Applicable to a UE camped in UTRAN HNB in states where autonomous reselection is not permitted The following steps may be taken in order to implement the bypassing of an H(e)NB in favor of a macro cell for the case of a UE camped in an UTRAN HNB in states where autonomous reselection is not permitted. Case 2 is similar to case 1, except that the ongoing RRC connection may be released prior to performing reselection. Case 2 has several alternative sub-embodiments.

In a first sub-embodiment, a handover procedure may be used. In this case, the UE may indicate in a measurement report, or by some other means, a target cell. The UE may also indicate the measurement report together with an indication that handover is requested for emergency.

In a second sub-embodiment, a handover procedure may also be used. In addition to the first sub-embodiment above, the UE may decode the broadcast channel of a non-serving cell. The UE then may receive some or all of the broadcast system information (MIB/SIB). If the non-serving cell is not a femtocell, or indicates that it reliably supports emergency calls in a manner that is supported by the UE (for example, the cell and UE may both support IMS-based emergency calls) the UE may transmit a message to the serving cell indicating one of several factors. An example of a factor may be sufficient identity information of the non-serving cell to allow the serving cell to initiate a handover preparation procedure towards the non-serving cell. This indication might assume that the serving cell is not aware of the existence of the non-serving cell. Another example of a factor may be measurement information, such as signal strength, signal quality, and other measurement information. Still another example of a factor may be an indication that handover is required for an emergency call. Other factors to be indicated may also exist.

The embodiments described with respect to cases 1 and 2 above allow for a handover to be completed which may be much faster than normal cell reselection. Furthermore, the femtocell controller need not be aware of the routing information applicable to the target cell. Yet further, the MIB/SIB reading might be required functionality in the UE for the purposes of inbound connected mobility towards cells such as femtocells This functionality may be already likely required for handover towards femtocells, and hence this embodiment requires little additional complexity.

Described in other terms, the UE, as an example the NAS, may be aware of CSG connectivity, meaning that that the UE may be camping or connected in a cell, such as a UTRAN femtocell. Upon the user attempting a CS emergency call in a femtocell, the NAS of the UE needs to establish a CS bearer and the UE may decide to trigger reselection to a macro cell before proceeding with the emergency call. If the UE is in Idle mode, cell re-selection to the target macro cell may be performed by the UE autonomously. If the UE is in Connected mode, because UE-initiated handover is not supported in UTRAN or E-UTRAN, the UE may release the existing RRC connection in the femtocell and establish a new call and RRC connection on the target macro cell.

The reselection might not be performed as a handover. Rather the UE may simply reselect autonomously to a macro cell of the same RAT type or different RAT type, depending on the result of the reselection. During the switch, other services that may have been active before the reselection may be dropped or put on hold. An example of such services may be PS data services, but might be any type of service. In an example, if the UE has connectivity to the packet core after the reselection, the UE may suspend the bearers using GPRS and EPC procedures. Once the UE has selected a macro UTRAN or GERAN cell or other cell where it is possible for the UE to establish an emergency call, the UE may establish an emergency call.

In a variation of case 2 presented above, the trigger is the setup of an IMS emergency call session. When an IMS-capable UE attempts to generate an emergency call, a UE might normally attempt to establish an emergency bearer, such as a PDN connection or PDP context or performing an emergency attach, to support the IP traffic for the IMS emergency call when the IMS application requests an emergency bearer. However, because the UE may know that the serving cell is a femtocell, when the IMS application requests an emergency bearer, the UE might not attempt to establish the emergency bearer on the femtocell. Instead, the UE may trigger a reselection to a macro cell of the same RAT or to a different RAT, such as UTRAN or GERAN (if the serving cell was E-UTRAN), or to a non-3GPP access technology, such as WLAN. In this case, the UE may continue emergency call establishment in the target cell. If the UE is in Idle mode, cell re-selection to the target macro cell may be performed by the UE autonomously. If the UE is in connected mode, and because UE-initiated handover is not supported in UTRAN or E-UTRAN, the UE may release the existing RRC connection in the femtocell and establish a new call and RRC connection on the target macro cell.

During the switch, other services, such as PS data services, that may have been active before the reselection may be dropped or put on hold. The emergency call establishment over the RAT to which the UE has reselected may be performed using IMS or using the CS domain.

In an embodiment, after reselection to a cell which does not support CS domain services (for example, E-UTRAN), the UE may continue establishment of an IMS emergency call by establishing an emergency bearer if the new cell supports VoIMS, as indicated to the UE in NAS signaling with the VoIMS Indication.

In another embodiment, the UE may reselect to a cell which may support both CS domain services and IMS (for example, a UTRAN cell). In this case, the UE can either continue establishment of IMS emergency call or the UE may establish a CS emergency call. The UE might continue establishment of the IMS emergency call if the cell supports VoIMS, as indicated to the UE in NAS signaling with the VoIMS Indication. The UE might be configured to prefer the use of VoIMS with respect to the use of the CS domain.

In still another embodiment, UE may reselect to a cell which supports CS domain services, but not IMS (for example, a GERAN cell). In this case, the UE may establish a CS emergency call.

In a variation of case 2 presented above, a core network entity (for example, the MME or SGSN) may be aware of H(e)NB connectivity. In this case, when an IMS UE attempts to generate an emergency call, the UE may attempt to establish an emergency bearer, such as a PDN connection or a PDP context, to support the IP traffic for the IMS emergency call.

The MME, for an E-UTRAN femtocell, or the SGSN or MSC, for a UTRAN HNB cell, may know that the UE is connected via an H(e)NB cell while in the UE is in connected mode. The network may reject the emergency bearer establishment. In this case, one of two events might occur. First, the UE may react by triggering reselection, as in the first variation of case 2 described above. Second, the network, such as the MME together with the serving H(e)NB of the UE or the SGSN or MSC together with the H(e)NB, may trigger the UE to handover to a macro cell. In one embodiment, the MME may signal the serving H(e)NB to instruct it to start the handover target cell selection and handover preparation mechanism of the UE. During the switch, other services, such as PS data services, that may have been active before the reselection may be dropped or put on hold.

In an embodiment, the UE may reselect to a cell which supports IMS, CS domain services, or both. This embodiments are described further respect to the first variation for case 2, as described above.

Case 3 for bypassing an H(e)NB in favor of a macro cell: When the UE is aware of H(e)NB connectivity, for example the VoLGA CS stack in the UE.

A third case with respect to the technique of bypassing an H(e)NB in favor of a macro cell is applicable when the UE is aware of H(e)NB connectivity, for example the VoLGA CS stack in the UE. In this case, the UE may be camping on a cell such as a UTRAN femtocell. Because the VoLGA CS connectivity is provided on top of an E-UTRAN PS bearer, the E-UTRAN NAS stack may provide to the VoLGA CS stack the indication that the UE is camping in a femtocell.

In this case, upon attempting a CS emergency call in a femtocell, the VoLGA CC machine in the UE may request the VoLGA CS stack in the NAS of the UE to establish a CS bearer. The UE, for example the VoLGA CS stack in the UE, may be aware of the UE being camped in or connected to a femtocell. Based on such knowledge, the UE may decide to trigger reselection to the macro coverage before proceeding with the emergency call.

The reselection might not be performed as a handover, but the UE simply might reselect to macro coverage of the same RAT type or different RAT type, depending on the result of the reselection. If the UE is in Idle mode, the UE may autonomously perform cell re-selection to a target macro cell to camp on. If the UE is in Connected mode, and because UE-initiated handover may not be supported in UTRAN or E-UTRAN, the UE may release the existing RRC connection in the femtocell and establish a new call and RRC connection on the target macro cell.

During the switch, other services, such as PS data services, that may have been active before the reselection may be dropped or put on hold. If the UE reselects to a UTRAN or GERAN macro cell, the UE may attach to the CS domain and establish a CS emergency call. If the UE reselects to a E-UTRAN macro cell, either the UE may establish a CS emergency call using the VoLGA CS stack over a non-emergency E-UTRAN bearer, or the UE may establish a CS emergency call using the VoLGA CS stack over an emergency E-UTRAN bearer.

Case 4 for bypassing an H(e)NB in favor of a macro cell: When the UE is configured by the network or the serving network and the UE may be configured to move macro access for an emergency call.

A fourth case with respect to the technique of bypassing an H(e)NB in favor of a macro cell is applicable when the UE is configured by the network or the serving network, and the UE is configured to move to macro access for emergency calls based on a specific list provided by an HPLMN. The network may be the home network, such as a HPLMN or an EHPLMN or some other home network. The serving network may be an RPLMN or other serving network. The UE may be configured using OMA DM and a specific management object, or by some other means. This fourth case may be combined with any of cases 1 to 3 described above.

In the embodiment of case 4, the network may configure the UE with a list of emergency enabled femtocells. This list may be used to provide an indication which identifies femtocells over which emergency calls may be established. The list may include several options, including but not limited to the following.

One option for the list may be a set of characterizing identifiers to indicate a set of cells in which the UE may establish emergency calls in a femtocell. These identifiers may indicate, for example, an MCC, an MNC, an LAI, and possibly other IDs. In this option, for example, the list might comprise a set of PLMN IDs (each comprising an MCC and MNC) and the UE might establish emergency calls in a femtocell only if the femtocell belongs to a PLMN whose PLMN ID is in the Emergency Enabled femtocells list. The UE might only use a list sent by the HPLMN or an EHPLMN. When such a list is received, the UE overwrites any previous list sent by the HPLMN or EHPLMN. This list could be stored as an elementary file in the USIM, or in Compact Flash, MicroSD, UICC, R-UIM or any other memory storage device. Alternatively, the list could be provided by the network to the UE during some other procedure, such as a RAU, a LAU, a TAU, an Attach procedure, or some other procedure. The list may be stored locally in the UE. In this case, if such a list is received from an RPLMN which is not the HPLMN or EHPLMN, then the UE may not overwrite the stored list.

Another option for the list of emergency enabled femtocells might apply if the network is only aware of the capabilities of H(e)NBs in its own network. In this case, the network may send a single indication indicating whether such H(e)NBs support emergency calls. The UE may use information from these indications gathered from RPLMNs to build a local list that keeps track of which PLMNs have CSG emergency support and which do not. For example, the UE may store an indication received from one PLMN and may make use of that indication while camped on a different PLMN, for example, to determine that a cell which the UE can detect but is not currently camped on may provide emergency services. This support may extend across equivalent PLMNS or may be specific to each PLMN. If the support extends across equivalent PLMNs, then the UE may extend the UE's CSG emergency support information by combining the single indication from the RPLMN with the EPLMN list sent by the RPLMN during a procedure, such as a RAU, a LAU, a TAU, an Attach procedure, or some other procedure.

Still another option for the list of emergency enabled femtocells is a set of specific IDs characterizing one or more femtocells. In this case, the UE may establish emergency calls in a femtocell, possibly only if the H(e)NB ID of the femtocell is in the Emergency Enabled femtocells list. This list could be sent to the UE during a procedure such as a RAU, a LAU, a TAU, an Attach procedure, or some other procedure. The validity of the list might be limited to the procedure used. The list might be replaced in its entirety by a new list upon changing areas. Alternatively, when a new list is received, the previous list stored in the UE could be added to or updated with the new information. This list may be stored locally in the UE.

Yet another option for the list of emergency enabled femtocells is a set of PLMN IDs and, for each PLMN ID, a set of H(e)NBs. In this case, the UE may establish emergency calls in a femtocell, possibly only if the Emergency Enabled femtocells list contains an entry with both the PLMN ID and the H(e)NB ID of the current femtocell. This procedure might be important if, at some point, the H(e)NB IDs were only unique to a PLMN, if the UE needed or desired to partition a very large list of H(e)NB to minimize search time when in a given PLMN, or if some other reason the procedure were important. This list could be stored in an EF in the USIM, or could be stored locally in the UE.

The above options are not exhaustive. Other options may exist. Additionally a combination of these options might be used, and other parameters may be added or combined with the above techniques.

Whatever option is selected, when the UE needs or desires to establish an emergency call while camping on or connected to (e.g. in connected mode in) a femtocell, the UE may verify the current femtocell information with the content of the Emergency Enabled femtocells list. This procedure may apply to both home and roaming scenarios. In an optional embodiment, the serving PLMN may provide the list of Emergency Enabled femtocells which the UE is allowed to use for H(e)NB emergency calls. This list may be provided in a MO.

II. Preparation for Reselection During an Emergency Call

The above embodiments described techniques for bypassing a femtocell, or using an allowed femtocell. Attention is now turned to a second technique for addressing the issues identified with placing emergency calls over an H(e)NB, described above. Specifically, the following embodiments provide for preparing cell reselection during or before an emergency call.

In particular, these embodiments may provide for conducting a background search during emergency call in a femtocell. In situations where the UE attempts the emergency call over the femtocell, the UE may prepare to reselect to a macro cell in case the call is dropped in the femtocell. This embodiment may be combined with the embodiments described above. For example, a UE might attempt to connect to a macro cell before connecting to a femtocell, as described above, and also may perform a background search in order to be able to reselect to another cell in case the connection used for the first emergency call fails for whatever reason.

Based on the UE knowing that it is connected to a femtocell, the UE may perform the background search during the emergency call in order to discover which target cell the UE should reselect to in order to re-establish the call if the connection with the current serving femtocell is dropped. The target cell may be another femtocell of the same RAT type, may be different RAT type, may be a macro cell of the same RAT type, may be a macro cell of a different RAT type, or may be any other suitable cell.

The UE may be in one of the scenarios described above with respect to bypassing a femtocell, in which case the UE may reselect to the target cell chosen based on the information obtained during the background search. Alternatively, the UE may be camping in or connected to a femtocell, and the UE is initiating an emergency call in the femtocell and performing call or RRC establishment for an emergency call. The UE may be performing a handover or performing an autonomous cell reselection.

The UE's background search may be triggered by one or more different triggers. In an embodiment, the UE may be triggered to perform a background search by the UE itself according to UE-specific implementations and parameters. In another embodiment, the UE may be triggered to perform a background search upon determining that the cell on which it is camped, or in which it is in active mode, meets particular criteria. Criteria may include, for example, that the cell is a femtocell, or the cell is an E-UTRAN cell, or the cell broadcasts a limited neighbor cell list (e.g. containing only cells of a single RAT type) or criteria may be based on the protocols and/or emergency services supported in the cell. In another embodiment, the UE may be triggered to perform a background search by an indication from H(e)NB to the UE. In this case, the H(e)NB may send a UE an explicit indication to perform a background search, or an indication of the level of the H(e)NB's remaining resources. For example, the H(e)NB may be running out of resources; thus, the requested call or the ongoing connection may not be guaranteed. When the UE receives the indication, the UE may perform a background search and may prepare to switch to the selected alternative cell if and when a switch is required or desired.

In another embodiment, a background scan initiated before an emergency call is initiated may be stopped once the call is initiated. Furthermore, the background scan may remain deactivated only while the connection is ongoing and the device is connected to the same cell.

In the embodiments described above, a background scan may include scanning for cells not in the neighbour cell list of the serving cell. The background scan may also include scanning for cells which are not normally expected to be monitored during a voice call. A cell might not be expected to be monitored because the H(e)NB may not be configured to broadcast a complete neighbour cell list, because the H(e)NB does not support handover of some or all types of services to some or all types of cells, and/or because the neighbour cell list does not include cells belonging to different PLMNs.

IDLE mode cell-reselection may be performed to a different PLMN. This scenario may enable the UE to find some cell on which to make an emergency call. However if the UE has a choice of available alternate cells, then the UE may select cells of the same PLMN. Similarly, if the background scan shows that several alternate cells are possible and acceptable, then cells in the same RA, LA, or TA might be prioritized above cells that are on a different PLMN, RA, LA, or TA.

In an embodiment, the UE may disable MIB or SIB reading and reporting of known or suspected femtocells during an emergency call. As a possible exception to such a disabling rule, the UE may not perform such disabling if the H(e)NB in question indicates clearly that the H(e)NB supports emergency calls. Another possible exception may be if the UE has stored information, such as fingerprinting information, which indicates that the H(e)NB in question supports emergency calls. As still another possible exception to such a disabling rule, the UE may not perform such disabling if there is no alternative handover candidate cell which could be reported in a measurement report.

Preparing for cell reselection during or before an emergency call minimizes service interruption to the ongoing emergency call. This technique also avoids attempts by the network to initiate handover to a femtocell which does not support the emergency service, though there may be an impact on the UE.

III. Limited Emergency Services

The above embodiments described techniques for bypassing a HeNB cell or using an allowed HeNB, and also provided for preparing for cell reselection before or during an emergency call. Attention is now turned to a third technique for addressing the issues identified with placing emergency calls over an HNB/HeNB, described above. Specifically, the following embodiments may provide for limiting emergency services support for which reliability may not be guaranteed, or for at least providing an indication that reliability is not guaranteed.

With respect to the concept of limiting emergency service support, three embodiments are described below. In a first embodiment, the HeNB cell may provide an indication to the UE of the availability of emergency call support. In a second embodiment, only non-guaranteed emergency services might be allowed. In a third embodiment, the UE may be redirected. These embodiments are described further below.

Attention is first turned to the first embodiment for limited emergency services support, which is for the HeNB cell to provide an indication of availability of emergency calls to the UE. This first embodiment may include four or more sub-embodiments.

In a first sub-embodiment, the indication may be provided at the AS level. When selecting where to camp, the UE may take into account this indication. The UE may select whether the UE can remain in that cell (that is, the one in which the indication was received) in idle mode, or the UE may determine whether the UE should perform reselection away from that cell. The UE may be configured, by femtocell operator, the user, or some other entity, to know whether to camp on an emergency call, attempt RRC connection establishment for an emergency call, and/or attempt RRC connection establishment for an emergency call if emergency services are known not to be available in the femtocell.

In this first sub-embodiment, an ECSI, described in further detail below, may be provided to the UE in broadcast AS level system information transmitted by the H(e)NB. The ECSI may indicate whether emergency calls are supported in the femtocell.

Once the UE receives an ECSI, the UE may select whether to remain camped in the current serving cell, or to perform reselection away to another cell, and/or in some other way attach to another cell. The decision of which cell to reselect may be based on the UE configuration and the ECSI. This decision may be further based on the existing information and mechanisms, such as the available H(e)NB information, the existing PLMN and cell selection mechanisms, and the existing cell reselection mechanisms.

The following steps are an example of a decision tree regarding this first sub-embodiment in the case where the UE determines that it should not remain in the current serving cell. First, the UE may perform PLMN selection. The UE may then perform cell selection or reselection. A determination is made whether a cell is available and suitable. In the case of a negative determination, the process returns to the first step of performing PLMN selection. In the case of a positive determination, a second determination is made whether the serving cell is a H(e)NB, and whether the cell does not support emergency services. If the ECSI indicates a negative second determination, then the process terminates. However, if the ECSI indicates a positive second determination, then a third determination is made whether the UE configuration indicates that UE is allowed to camp on an H(e)NB not supporting emergency services. A negative third determination results in the process returning to the step of performing cell selection and reselection. A positive third determination results in the process terminating. If, at any point in the process, the UE has a choice of multiple cells to consider, one or more cells may be prioritized to maintain the same PLMN, RA, TA, or LA as the serving cell.

A second sub-embodiment (which may be combined with the first sub-embodiment) for providing emergency services support may be for the UE to receive an ECSI indicator at the AS level and, possibly subsequently, select how to establish the emergency call. In this sub-embodiment, when the UE is camped on the H(e)NB and the user attempts to establish an emergency call, the UE may decide whether to reselect to a macro cell and establish the emergency call using mechanisms specific to the RAT of the macro coverage. The decision to perform reselection may be based on the UE configuration and the ECSI.

A third sub-embodiment for providing emergency services support may be to provide the ECSI indication in NAS signaling and then allow the UE to select where to attach (for example, similar to the first sub-embodiment) or allow the UE to select where to place emergency calls (for example, similar to the second sub-embodiment). The ECSI may be provided to the UE upon initial attach or upon performing RAU procedure, for a GERAN or UTRAN, or upon performing a TAU procedure, for LTE.

In an embodiment, the RAU and TAU procedures might not be performed when the UE selects the femtocell, because the femtocell might not be in a separate RA or TA with respect to the macro coverage. In this case, the ECSI might not be available to the UE.

In any case, the UE may select whether to remain attached to the femtocell or to reselect to the macro coverage RAT based on the UE configuration and/or the ECSI. This selection may be further based on the existing information and mechanisms, such as the available H(e)NB information, the existing PLMN and cell selection mechanisms, and the existing cell reselection mechanisms.

A fourth sub-embodiment for providing emergency services support may be to provide the ECSI indication and NAS signaling and to allow the UE to decide how to establish the emergency call using different techniques. In this fourth sub-embodiment, the UE may be configured, by a femtocell operator, the user, or some other entity, to know whether to attach to a femtocell when emergency services are not available in the femtocell. An ECSI may be provided to the UE upon initial attach or RAU procedure, for GERAN or UTRAN, or upon a TAU procedure, for LTE. The ECSI may indicate whether emergency calls are supported in the femtocell.

In an embodiment, the RAU and TAU procedures might not be performed when the UE selects the femtocell because the femtocell might not be in a separate RA or TA with respect to the macro coverage. In this case, the ECSI might not be available to the UE.

The UE then may select the femtocell to attach to the network. When the user attempts to establish an emergency call, the UE may decide whether to reselect to another cell and establish the emergency call using mechanisms specific to the RAT of the selected cell. This selection may be based on the UE configuration and/or the ECSI.

The above embodiment, providing the ECSI to the UE at the AS level, described the concept of limiting emergency service support. In that embodiment, the femtocell may provide an indication to the UE of the availability of emergency call support.

In an embodiment, a user choice option may be used to indicate that the choice is between the current cell and nothing else (if no other cells have been detected). Thus, a user may be given some measure of control over the UE behavior.

Attention is now turned to the second embodiment regarding the concept of limiting emergency service support, that of providing non-guaranteed emergency services. This embodiment is described further below.

In the case where limited emergency services are provided i.e. for which reliability is not guaranteed, the femtocell may indicate support of limited emergency services by providing to the UE the ECSI with a value indicating that only limited emergency services are supported. The owner or operator of the femtocell may decide to set the ECSI to indicate that only limited emergency services are supported if the owner does not want to assume liability in case of failure of emergency calls established over the femtocell.

This second embodiment regarding limited emergency services presents at least two sub-embodiments. The first sub-embodiment is that the ECSI may be provided to the UE as the AS level. The second sub-embodiment is that the ECSI may be provided to the UE in NAS signaling.

In the first sub-embodiment, that of providing the ECSI to the UE at the AS level, four sub-issues are addressed. These sub-issues include the UE selecting where to attach, the UE deciding how to establish the emergency call, the user selecting where to attach, and the user deciding how to establish the emergency call.

The first of these sub-issues is the embodiment where the UE selects where to attach. The UE may be configured, by a femtocell operator, the user, or some other entity, to know whether to attach to a femtocell when only limited emergency services are available in the femtocell. The UE may select whether to attach to the femtocell or to the macro cell based on the UE configuration and the value of the ECSI. This selection may be further based on existing information and mechanisms, such as the available H(e)NB information, the existing PLMN and cell selection mechanisms, and the existing cell reselection mechanisms.

The second of these sub-issues is the embodiment where the UE decides how to establish the emergency call. In this embodiment, the UE may select the femtocell to attach to the network, if at initial attach. Alternatively, the UE may decide to move into a femtocell based on existing information and mechanisms, such as the available H(e)NB information, the existing PLMN and cell selection mechanisms, and the existing cell reselection mechanisms.

The UE may be configured, by a femtocell operator, the user, or some other entity, to know whether to establish emergency calls in a femtocell when only limited emergency services are available in the femtocell. When the user attempts to establish an emergency call, the UE may decide whether to move to the macro coverage and establish the emergency call using mechanisms specific to the RAT of the macro coverage. Alternatively, the UE may decide to remain in the femtocell based on the UE configuration and the ECSI.

The third of these sub-issues is the where the user selects where to attach. In a first scenario, the UE may provide the indication to the user before selecting to attach to the femtocell. This indication may be provided by a display indication, a sound, a vibration, or any other suitable means. This indication communicates that only limited emergency services may be available in a given H(e)NB, with the determination of the existence of limited emergency services being based on the value of the ECSI obtained from the AS.

The UE may be configured by the network or the user to indicate such information to the UE for all the H(e)NBs available in the current UE location, or only for the H(e)NBs that the UE is allowed to access. The user may select whether being able to access only limited emergency services is acceptable, whereupon the user may indicate acceptance or refusal to accept to the UE. This indication may be performed by selecting an appropriate option in a menu, by pressing a particular button, or by any other suitable means. The UE may then select whether to attach to the femtocell or to the macro coverage RAT based on the user indication. The decision whether to select may be further based on the existing information and mechanisms, such as the available H(e)NB information, the existing PLMN and cell selection mechanisms, and the existing cell reselection mechanisms.

In a second scenario, relating to where the user selects where to attach, the UE may detect the femtocell and may determine to attach to the femtocell based on existing information and mechanisms, such as the available H(e)NB information, the existing PLMN and cell selection mechanisms, and the existing cell reselection mechanisms. In addition, or instead, the UE may take into account whether or not it has received an ECSI. An ECSI may not be received, for example because no TAU or RAU is performed, or the UE has not read the AS SIB broadcast from the femtocell that carries the ECSI before the decision to attach the femtocell is made.

If the UE attaches to the femtocell and subsequently receives the ECSI, and if the H(e)NB ECSI indicates that only limited emergency services are supported, the UE may provide the indication to the user that only limited emergency services are available in the current femtocell. This indication may be through a display indication, a sound, a vibration, or any other suitable indication.

The user then may select whether being able to access only limited emergency services is acceptable. The user may then indicate to the UE the acceptability or refusal by selecting an appropriate option in a menu, by pressing or a button, or by any other suitable means. Based on such indication, the UE then may select whether to remain attached to the current femtocell with limited emergency services, or to reselect to a macro cell. If no macro cell is available, the UE may remain in the current cell even if only limited emergency services are available.

Attention is now drawn to the fourth of the sub-issues regarding providing the ECSI to the UE at the AS level. This fourth sub-issue may be the user deciding how to establish the emergency call.

In this embodiment, the UE may select the femtocell to which the UE will attach, if at initial attach, or the UE may decide to move into a femtocell based on existing information and mechanisms. These mechanisms may include the available H(e)NB information, the existing PLMN and cell selection mechanisms, the existing cell reselection mechanisms, and other mechanisms.

In a first scenario, if the femtocell provided an ECSI that indicates that only limited emergency services are supported, then the UE may provide the indication to the user. This indication may be provided through a display indication, a sound, a vibration, or any other suitable indication. This indication communicates that only limited emergency services may be available in the current femtocell. The user may then select whether being able to access only limited emergency services is acceptable. The user may also indicate acceptance or refusal to the UE. The indication of refusal or acceptance may be by selecting a menu option, by pressing a button, or by any other suitable means. When the user attempts to establish an emergency call, the UE may decide whether to reselect to a macro cell and establish the emergency call using mechanisms specific to the RAT of the macro coverage, or to remain in the femtocell. This decision may be based on the user indication.

In a second scenario, when the user attempts to establish an emergency call in the femtocell, if the femtocell provided an ECSI that indicates that only limited emergency services are supported, the UE may provide the indication to the user. This indication may be through a display indication, a sound, a vibration, or any other suitable means. This indication may communicate that only limited emergency services are available in the current femtocell. The user may select whether being able to access only limited emergency services is acceptable. The user may then indicate to the UE the acceptance or refusal. This indication may be made by selecting an appropriate option in a menu, by pressing a button, or by any other suitable mechanism. Based on such indication, the UE may decide whether to move to the macro cell and establish the emergency call using mechanisms specific to the RAT of the macro coverage, or remain in the femtocell. This decision may be further based on the previous user indication.

The first sub-embodiment, that the ECSI may be provided to the UE at the AS level, has now been described. Attention is now turned to the second sub-embodiment regarding limited emergency services, wherein the ECSI may be provided to the UE in NAS signaling.

In this second sub-embodiment, the ECSI may be provided to the UE upon the initial attach procedure, upon performing a RAU procedure for GERAN/UTRAN, or upon performing a TAU procedure for LTE. The ECSI may be provided if the UE performs a RAU or TAU procedure when moving to the femtocell, whether the UE is in idle mode or the UE is undergoing a handover procedure. In an embodiment, the RAU and TAU procedures might not be performed when the UE selects the femtocell, because the femtocell might not be in a separate RA or TA with respect to the previous serving cell.

This second sub-embodiment regarding providing the ECSI in NAS signaling presents four sub issues. These sub-issues are the UE deciding where to attach, the UE deciding how to establish the emergency call, the user deciding where to attach, and the user deciding how to establish the emergency call.

The first sub-issue regarding providing the ECSI in NAS signaling is the UE deciding where to attach. In this embodiment the UE may be configured to know whether to establish emergency calls in a femtocell when only limited emergency services are available in the femtocell. This configuration may be made by femtocell operator or by the user.

The UE may select whether to remain attached to the femtocell or to reselect to the macro coverage RAT. This selection may be based on the UE configuration and the value of the ECSI. This selection may be further based on existing information and mechanisms, such as the available H(e)NB information, the existing PLMN and cell selection mechanisms, the existing cell reselection mechanisms, and other mechanisms.

The second sub-issue regarding providing the ECSI in NAS signaling is the UE deciding how to establish the emergency call. In this embodiment, the UE may select the femtocell to attach to the network, if at initial attach, or may decide to move into a femtocell based on existing information and mechanisms such as those described above.

The UE might be configured, by a femtocell operator, the user, or some other entity, to know whether to establish emergency calls in a femtocell when only limited emergency services are available in the femtocell. When the user attempts to establish an emergency call, the UE may decide whether to move to the macro coverage and establish the emergency call using mechanisms specific to the RAT of the macro coverage, or to remain in the femtocell. This decision may be based on the UE configuration. This decision may be further based on the ECSI, if the UE performed a TAU or RAU procedure in the inbound idle mobility or handover to the femtocell, and wherein an ECSI was received by the UE.

The third sub-issue regarding providing the ECSI in NAS signaling is the user deciding where to attach. In a first scenario, the UE may provide the indication to the user before selecting to attach to the femtocell. This indication may be provided by a display indication, a sound, a vibration, or any other suitable means. This indication may communicate that only limited emergency services may be available in a given H(e)NB, with the determination of the existence of limited emergency services being based on the value of the ECSI obtained from the AS.

The UE may be configured by the network or the user to indicate such information to the user for all the H(e)NBs available in the current UE location, or only for the H(e)NBs that the UE is allowed to access. The user may select whether being able to access only limited emergency services is acceptable, whereupon the user may indicate acceptance or refusal to accept to the UE. This indication may be performed by selecting an appropriate option in a menu, by pressing a particular button, or by any other suitable means. The UE may then select whether to attach to the femtocell or to the macro coverage RAT based on the user indication. The decision whether to select may be further based on the existing information and mechanisms, such as the available H(e)NB information, the existing PLMN and cell selection mechanisms, and the existing cell reselection mechanisms.

In a second scenario, relating to the embodiment where the user selects where to attach, the UE may detect the femtocell and decide whether to attach to the femtocell or to the macro coverage RAT. This decision of where to attach may be based on existing information and mechanisms, such as the available H(e)NB information, the existing PLMN and cell selection mechanisms, and the existing cell reselection mechanisms. For example, the UE may consider whether no NAS ECSI is provided to the UE. This lack of provision may occur when no TAU or RAU procedure is performed, or when the UE has not read the AS SIB broadcast from the femtocell that carries the ECSI before the decision to attach the femtocell is made.

The fourth sub-issue regarding providing the ECSI in NAS signaling is the user deciding how to establish the emergency call. In this embodiment, the UE may select the femtocell to attach to the network, if at initial attach, or may decide to move into a femtocell based on existing information and mechanisms, such as those described above.

In a first scenario, the UE may have performed an attach procedure to the femtocell or a TAU or RAU procedure when moving to the femtocell. In either case, if the UE received an ECSI from the femtocell that indicates that only limited emergency services are supported, then the UE may provide the indication to the user. This indication may take the form of a display indication, a sound, a vibration, or any other indication. The user may then select whether being able to access only limited emergency services is acceptable. The user may then provide acceptance or refusal to the UE by selecting an appropriate option in a menu, by pressing a button, or by any other suitable mechanism.

When the user attempts to establish an emergency call, the UE may decide whether to move to the macro cell coverage and establish the emergency call using mechanisms specific to the RAT of the macro coverage, or remain in the femtocell. This decision may be based on the user indication.

In a second scenario, the may user attempt to establish an emergency call in the femtocell. In this case, if the UE received an ECSI from the femtocell that indicates that only limited emergency services are supported, the UE may provide the indication to the user. This indication may be provided by a display indication, a sound, a vibration, or any other suitable mechanism. The indication communicates that only limited emergency services may be available in the current femtocell. The user may then select whether being able to access only limited emergency services is acceptable. The user may indicate it to the UE the acceptance or refusal by selecting an appropriate option in a menu, by pressing a button, or by any other suitable mechanism.

Based on such indication, the UE may decide whether to reselect to a macro cell and establish the emergency call using mechanisms specific to the RAT of the macro coverage, or to remain in the femtocell. This decision may be based on the previous user indication.

The second embodiment for limited emergency services, providing non-guaranteed emergency services, has now been described. Attention is now turned to the third embodiment, which is to redirect the UE.

In this embodiment, the UE may be configured, by a femtocell operator, the user, or another entity, to know whether to establish emergency calls in a femtocell when emergency services are not available in the femtocell or when only limited emergency services are supported. The UE may also be configured to know whether to attach to the femtocell when there is no macro coverage, even if emergency services are not supported in the femtocell.

When the UE attaches to the femtocell or performs a RAU or TAU procedure to a femtocell, the UE may indicate the need for emergency calls support in the Attach Request message or in the RA Request or TA Request messages. The following two techniques may be used to provide this indication for the need for emergency services. First, an ECRI, defined further below, may be provided. The ECRI may have a value indicating that emergency services are required and that, if limited or non-guaranteed emergency services are defined in the network, that such services are not sufficient for the UE. In a second technique, if non-guaranteed emergency services are defined in the network, an ECRI may be provided that has a value indicating that at least limited or non-guaranteed emergency services are required, and that regular emergency services are also acceptable.

In an embodiment, if the femtocell supports only non-guaranteed or limited emergency services, and the UE provided an ECRI to the femtocell with a value indicating that emergency services are required, then the femtocell may return an Attach Reject message or RA Update/TA Update Reject message with any of the following parameters. A first parameter may be an error code indicating to the UE that emergency services are not supported. For example, an ECSI may be provided having a value indicating that no emergency services are available. A second parameter may be an error code indicating to the UE that only limited or non-guaranteed emergency services are supported. For example, an ECSI may be provided having a value indicating that only "limited emergency services" are supported. Other parameters might also be used.

The returned reject message described above, with associated parameters, may also be provided if the femtocell supports no emergency services and the UE provided an ECRI to the femtocell either with a value indicating that emergency services or a value indicating that at least limited emergency services are required. The returned reject message described above, with associated parameters, may also be transmitted by an eNB when the UE did not provide an ECRI based on H(e)NB-specific information or other information.

Upon receiving the response from the network that no emergency service, limited emergency services, or non-guaranteed emergency services are supported, the UE may reselect to a macro cell. If no macro cell is available within the coverage area, the UE may reattempt the registration to the femtocell by providing an ECRI indicating that no emergency services are required, or by not providing any special indications related to emergency services. In either case, the femtocell may be made aware that the UE will accept the lack of guaranteed emergency services.

Upon receiving the response from the network that no emergency service, limited emergency services, or non-guaranteed emergency services are supported, the UE may detect macro cells and identify if they are available to support an emergency call. In some cases, a roaming UE may make emergency calls on a PLMN even if no roaming agreement exists with the HPLMN. If no macro cell is available that can support an emergency call for that UE, then the UE may reattempt the registration to the femtocell by providing an ECRI indicating that no emergency services are required, or by not providing any special indications related to emergency services.

In an embodiment, the UE may or may not indicate to the user the lack of emergency services. The user may also provide an indication whether the UE should reselect to a macro cell when available, such as upon the user establishing an emergency call or when a macro cell is detected within the coverage area.

When the user attempts to establish an emergency call, the UE may decide whether to reselect to a macro cell and establish the emergency call using mechanisms specific to the RAT of the macro coverage. This decision may be based on the UE configuration, the user indication, or some other input.

In the embodiments described above, the functions of the ECSI and the ECRI were presented. These functions may be implemented by setting one or more values of one or more bits. In an embodiment, the ECSI may have four different values and/or messages, though other values or messages are also possible. The ECSI may indicate "emergency services not supported," meaning that no emergency service may be supported in the femtocell. The ECSI may indicate "emergency services supported," meaning that full emergency service may be supported in the femtocell. The ECSI may also indicate "only limited emergency services supported," meaning that limited or non-guaranteed emergency services are supported. The ECSI may also indicate that the femtocell is too congested for reliable emergency calls, as described further below.

In turn, the ECRI may have two different values, though other values or messages are also possible. The ECRI may indicate "emergency services required," meaning that the UE may require not only limited emergency services, but complete emergency services. The ECRI may also indicate "limited emergency services required," meaning that the UE may require at least limited or non-guaranteed emergency services.

The above embodiments describe the function of the ECSI. The following is an example of an implementation of an ECSI added to a SIB1 of a RRC protocol specification.

```
SystemInformationBlockType1 message
-- ASN1START
SystemInformationBlockType1 ::= SEQUENCE {
    cellAccessRelatedInfo      SEQUENCE {
        plmn-IdentityList          PLMN-IdentityList,
        trackingAreaCode           TrackingAreaCode,
        cellIdentity               CellIdentity,
        cellBarred                 ENUMERATED {barred, notBarred},
        intraFreqReselection       ENUMERATED {allowed, notAllowed},
        csg-Indication             BOOLEAN,
        csg-Identity               BIT STRING (SIZE (27)) OPTIONAL--NeedOR
    },
    cellSelectionInfo              SEQUENCE {
        q-RxLevMin                     Q-RxLevMin,
        q-RxLevMinOffset               INTEGER (1..8) OPTIONAL--Need OP
    },
    p-Max                          P-Max      OPTIONAL,-- Need OP
    freqBandIndicator              INTEGER (1..64),
    schedulingInfoList             SchedulingInfoList,
    tdd-Config                     TDD-Config OPTIONAL, -- Cond TDD
    si-WindowLength                ENUMERATED {
                                       ms1, ms2, ms5, ms10, ms15, ms20,
                                       ms40},
    systemInfoValueTag             INTEGER (0..31),
    nonCriticalExtension           SEQUENCE (OPTIONAL -- Need OP
        ecsi                           ENUMERATED {supported,
```

```
                         notSupported, limitedService, congested}
    }
}
PLMN-IdentityList ::=      SEQUENCE (SIZE (1..6)) OF PLMN-IdentityInfo
PLMN-IdentityInfo ::=      SEQUENCE {
plmn-Identity                  PLMN-Identity,
    cellReservedForOperatorUse     ENUMERATED {reserved, notReserved}
}
SchedulingInfoList ::= SEQUENCE (SIZE (1..maxSI-Message)) OF SchedulingInfo
SchedulingInfo ::=   SEQUENCE {
    si-Periodicity                 ENUMERATED {
                                       rf8, rf16, rf32, rf64, rf128, rf256, rf512},
    sib-MappingInfo                SIB-MappingInfo
}
SIB-MappingInfo ::= SEQUENCE (SIZE (0..maxSIB-1)) OF SIB-Type
SIB-Type ::=                   ENUMERATED {
                                   sibType3, sibType4, sibType5, sibType6,
                                   sibType7, sibType8, sibType9, sibType10,
                                   sibType11, spare7, spare6, spare5,
                                   spare4, spare3, spare2, spare1, ... }
-- ASN1STOP
```

The following table is an exemplary set of SIB1 field descriptions for the above exemplary SIB1. Different SIBs and field descriptions are possible, some parameters that are indicated as being mandatory or having particular values may be varied in different embodiments.

| SystemInformationBlockType1 field descriptions |
| --- |
| plmn-IdentityList |
| List of PLMN identities. The first listed PLMN-Identity is the primary PLMN. |
| cellReservedForOperatorUse |
| As defined in TS 36.304 [4]. |
| trackingAreaCode |
| A trackingAreaCode that is common for all the PLMNs listed. |
| cellBarred |
| 'barred' means the cell is barred, as defined in TS 36.304 [4]. |
| intraFreqReselection |
| Used to control cell reselection to intra-frequency cells when the highest ranked cell is barred, or treated as barred by the UE, as specified in TS 36.304 [4]. |
| csg-Indication |
| If set to TRUE the UE is only allowed to access the cell if the CSG identity matches an entry in the allowed CSG list that the UE has stored. |
| q-RxLevMinOffset |
| Parameter $Q_{rxlevminoffset}$ in 36.304 [4]. Actual value $Q_{rxlevminoffset}$ = IE value * 2 [dB]. If absent, apply the (default) value of 0 [dB] for $Q_{rxlevminoffset}$. Affects the minimum required Rx level in the cell. |
| p-Max |
| Value applicable for the cell. |
| freqBandIndicator |
| Defined in TS 36.101 [42, table 5.5-1]. |
| si-Periodicity |
| Periodicity of the SI-message in radio frames, such that rf8 denotes 8 radio frames, rf16 denotes 16 radio frames, and so on. |
| sib-MappingInfo |
| List of the SIBs mapped to this SystemInformation message. There is no mapping information of SIB2; it is always present in the first SystemInformation message listed in the schedulingInfoList list. |
| si-WindowLength |
| Common SI scheduling window for all SIs. Unit in milliseconds, where ms1 denotes 1 millisecond, ms2 denotes 2 milliseconds and so on. |

| | |
|---|---|
| systemInfoValueTag | |
| | Common for all SIBs other than MIB, SIB1, SIB10 and SIB11. |
| csg-Identity | |
| | Identity of the Closed Subscriber Group within the primary PLMN the cell belongs to. The IE is present in a CSG cell. |
| ecsi | |
| | Emergency call support indicator. Set to 'supported' to indicate that the cell supports emergency service. Set to 'notSupported' to indicate that the cell does not support emergency service. Set to 'limitedService' to indicate the cell supports limited emergency service. Set to 'congested' to indicate the cell is congested and emergency service support may be limited. |

| Conditional presence | Explanation |
|---|---|
| TDD | This field is mandatory present for TDD; it is not present for FDD and the UE shall delete any existing value for this field. |

IV. Addressing H(e)NB/HNB Cell Congestion

The third embodiment for addressing the issues related to placing emergency calls on H(e)NB/HNB cells has now been described. Attention is now turned to the fourth technique for addressing these issues, which is related to H(e)NB/HNB cell congestion. In the event of femtocell congestion, the UE may be capable of reselecting to a macro cell without needing to be handed over by the network. This reselection to a macro cell may be performed in idle mode or connected mode, and may be performed without handover coordination by the network. These embodiments might be combined with earlier embodiments as if emergency services were not available.

The UE may detect cell congestion using one or more of several different techniques. Five different techniques for detecting cell congestion are presented below, though others are possible. One or more of these techniques might be combined with each other in whole or part.

In a first embodiment, the UE may be informed by the femtocell that the cell is congested using an indication of the availability of emergency calls, using the corresponding technique described above. Thus, the femtocell may transmit the indication of cell congestion to the UE using an implicit indication.

For example, the femtocell may indicate congestion by providing the UE with an indication that no emergency services are supported in the femtocell. Alternatively, the UE may be configured by the operator to know whether the UE should camp in a cell with limited emergency services, or whether the UE should reselect to another cell. The UE may be configured by the operator providing configuration information in a MO, and/or the UE may be configured by the user through a user interface.

In a second embodiment regarding the detection of cell congestion, the UE may be informed by the femtocell that a cell is congested by providing an implicit indication of limited or non-guaranteed emergency service, using the corresponding technique described above. The actual indication may be transmitted in a manner similar to that presented in the previous embodiment.

In a third embodiment regarding the detection of cell congestion, the UE may be informed by the femtocell that the cell is congested by using an explicit indication of limited or non-guaranteed emergency service, using the corresponding technique described above. In this case, the femtocell may provide the UE an ECSI having a specific value indicating that the cell is congested. The UE may be configured by the operator to know whether the UE should camp in a congested femtocell where emergency calls may not be successful, or whether the UE should reselect to another cell. The UE may be configured by the operator by providing configuration information in a MO, and/or by the user through a user interface.

In a fourth embodiment regarding the detection of cell congestion, the UE may be informed by the femtocell that the cell is congested with an explicit indication independent of emergency call support. This indication may be provided at the AS level, by the femtocell directly, or at the NAS level, by the SGSN or MME, if these components are aware of the femtocell being congested. The indication may take the form of a new field introduced to the system information broadcast to indicate a loading level of the femtocell.

In a fifth embodiment regarding the detection of cell congestion, the UE may detect implicitly that the cell is congested when an emergency call established on the femtocell is dropped. In this case, the UE may autonomously reselect to another cell, which may be another femtocell or a macro cell in the same or different RAT. This embodiment may be used in conjunction with performing a background search during an emergency call. Combining these techniques may be used to optimize reselection to another cell.

Certain details of explicit cell congestion notification will now be addressed. In one embodiment, the femtocell may broadcast the loading level of the cell using system information broadcasts, such as SIB1. In the case of E-UTRAN, SIB2 may be used. A field called 'loading level' may be added to the existing SIB1 or SIB2 to indicate the level of loading. The field may have any other name, so long as the field indicates a level of loading. Exemplary levels of loading might be expressed as a percentage of the loading versus the total resources available, such as 10%, 20%, 90%, 100%, or any other value.

In another embodiment, the femtocell may broadcast a flag to indicate if the cell is congested or not. The flag may be broadcast in SIB1 or SIB2. A one-bit field called 'congestion' may be added to the existing SIB1 and SIB2, though the field may have any convenient name.

Either of the two above embodiments may also be applicable to regular macro cells. Either of the two above embodiments may also be applicable to other cell types.

The above embodiments describe some of the functions and embodiments of cell congestion notification. The following is an example of an implementation of an ECCN added to a SIB1 of a RRC protocol specification.

```
SystemInformationBlockType1 message
-- ASN1START
SystemInformationBlockType1 ::=SEQUENCE {
    cellAccessRelatedInfo           SEQUENCE {
        plmn-IdentityList               PLMN-IdentityList,
        trackingAreaCode                TrackingAreaCode,
        cellIdentity                    CellIdentity,
        cellBarred                      ENUMERATED {barred, notBarred},
        intraFreqReselection            ENUMERATED {allowed, notAllowed},
        csg-Indication                  BOOLEAN,
        csg-Identity                    BIT STRING (SIZE (27)) OPTIONAL-- Need OR
    },
    cellSelectionInfo               SEQUENCE {
        q-RxLevMin                      Q-RxLevMin,
        q-RxLevMinOffset                INTEGER (1..8)          OPTIONAL -- Need OP
    },
    p-Max                           P-Max                   OPTIONAL, -- Need OP
    freqBandIndicator               INTEGER (1..64),
    schedulingInfoList              SchedulingInfoList,
    tdd-Config                      TDD-Config              OPTIONAL, -- Cond TDD
    si-WindowLength                 ENUMERATED {
                                        ms1, ms2, ms5, ms10, ms15, ms20,
                                        ms40},
    systemInfoValueTag              INTEGER (0..31),
    nonCriticalExtension            SEQUENCE {              OPTIONAL -- Need OP
        eccn                            ENUMERATED {load10, load20, load30, load40,
                                            load50 load60, load70, load80, load90, load100}
    }
}
PLMN-IdentityList ::=       SEQUENCE (SIZE (1..6)) OF PLMN-IdentityInfo
PLMN-IdentityInfo ::=       SEQUENCE {
    plmn-Identity               PLMN-Identity,
    cellReservedForOperatorUse  ENUMERATED {reserved, notReserved}
}
SchedulingInfoList ::= SEQUENCE (SIZE (1..maxSI-Message)) OF SchedulingInfo
SchedulingInfo ::= SEQUENCE {
    si-Periodicity              ENUMERATED {
                                    rf8, rf16, rf32, rf64, rf128, rf256, rf512},
    sib-MappingInfo             SIB-MappingInfo
}
SIB-MappingInfo ::= SEQUENCE (SIZE (0..maxSIB-1)) OF SIB-Type
SIB-Type ::=                ENUMERATED {
                                sibType3, sibType4, sibType5, sibType6,
                                sibType7, sibType8, sibType9, sibType10,
                                sibType11, spare7, spare6, spare5,
                                spare4, spare3, spare2, spare1, ... }
-- ASN1STOP
```

The following table is an exemplary set of SIB1 field descriptions for the above exemplary SIB1. Different SIBs and field descriptions are possible, some parameters that are indicated as being mandatory or having particular values may be varied in different embodiments.

| SystemInformationBlockType1 field descriptions |
| --- |
| plmn-IdentityList |
| List of PLMN identities. The first listed PLMN-Identity is the primary PLMN. |
| cellReservedForOperatorUse |
| As defined in TS 36.304 [4]. |
| trackingAreaCode |
| A trackingAreaCode that is common for all the PLMNs listed. |
| cellBarred |
| 'barred' means the cell is barred, as defined in TS 36.304 [4]. |
| intraFreqReselection |
| Used to control cell reselection to intra-frequency cells when the highest ranked cell is barred, or treated as barred by the UE, as specified in TS 36.304 [4]. |
| csg-Indication |
| If set to TRUE the UE is only allowed to access the cell if the CSG identity matches an entry in the allowed CSG list that the UE has stored. |

-continued q-RxLevMinOffset

Parameter $Q_{rxlevminoffset}$ in 36.304 [4]. Actual value $Q_{rxlevminoffset}$ = IE value * 2 [dB]. If absent, apply the (default) value of 0 [dB] for $Q_{rxlevminoffset}$. Affects the minimum required Rx level in the cell.
p-Max Value applicable for the cell.
freqBandIndicator Defined in TS 36.101 [42, table 5.5-1].
si-Periodicity Periodicity of the SI-message in radio frames, such that rf8 denotes 8 radio frames, rf16 denotes 16 radio frames, and so on.
sib-MappingInfo List of the SIBs mapped to this SystemInformation message. There is no mapping information of SIB2; it is always present in the first SystemInformation message listed in the schedulingInfoList list.
si-WindowLength Common SI scheduling window for all SIs. Unit in milliseconds, where ms1 denotes 1 millisecond, ms2 denotes 2 milliseconds and so on.
systemInfoValueTag Common for all SIBs other than MIB, SIB1, SIB10 and SIB11.
csg-Identity Identity of the Closed Subscriber Group within the primary PLMN the cell belongs to. The IE is present in a CSG cell.
eccn Explicit cell congestion notification. load10 denotes 10% loading, load20 denotes 20% loading and so on.

| Conditional presence | Explanation |
|---|---|
| TDD | This field is mandatory present for TDD; it is not present for FDD and the UE shall delete any existing value for this field. |

Overview of Some of the Embodiments.

Some, but not all, of the embodiments described above relate to four different techniques for dealing with reliability issues in an H(e)NB when a UE places an emergency call. In one embodiment, reliability for emergency calls is ensured by a UE bypassing any H(e)NB/HNB cells in favor of a detected macro cell. In another embodiment, the UE might establish an emergency call through an H(e)NB/HNB; however, the UE may perform background reselection to another cell during the call so that handover or re-establishment of the call may be performed quickly in case of a failure related to the H(e)NB/HNB. In still another embodiment, an ECRI may be transmitted to a network by a UE or an ECSI by a network to a UE, so that the UE may decide whether to use an H(e)NB/HNB to establish an emergency call. In yet another embodiment, the UE may be notified of possible congestion in an H(e)NB/HNB so that the UE may decide whether to use an H(e)NB/HNB to establish an emergency call.

In all four of these embodiments, and in other embodiments described herein, certain new UE attachment procedures might be implemented. Other new procedures, such as RAU or TAU procedures, might also be implemented. Attention is now turned to such procedures.

UE Attachment Procedures

When the UE initiates an attach procedure, the UE may or shall include an indication of the type of emergency services the UE requires or desires, which may be provided to the upper layers of a network. The type may indicate guaranteed service, non-guaranteed service, a priority level, a handover service request, a requirement for a macro cell, or any other type as described herein. In turn, the network may or shall include in an "attach accept" message an indication of the type of emergency services supported. The UE may or shall provide the indication of the type of emergency services supported to the upper layers. In an embodiment, the UE may or shall select a cell based on the network indication of the type of emergency services supported, and/or decide whether to remain attached to the current cell or reselect to another cell.

The above procedures may also be implemented with respect to other normal periodic procedures, either additionally to, alternatively to, or in combination with the attach procedure described above. For example, when a UE initiates a RAU, the UE may or shall include an indication of the type of emergency services the UE requires. The network may or shall include in a "RAU update accept" an indication of the type of emergency services supported. The UE may or shall provide the indication of the type of emergency services supported to the upper layers of a network component.

Attachment Failure

If an attach procedure fails due to the lack of support in the femtocell of emergency services, or due to the lack of support in the femtocell of the emergency services requested by the UE, or due to the cell being too congested for reliable emergency calls, a reject cause may or shall be set to a value corresponding to "Emergency Services Not available in CSG." In another embodiment, if these conditions are satisfied, then the MME may or shall combine the ATTACH REJECT message with a PDN CONNECTIVITY REJECT message contained in the ESM message container IE. In this case, the EMM cause value in the ATTACH REJECT message may or shall be set to a value such as "Emergency Services Not Available in CSG."

If the ATTACH REJECT is received, then the UE may or shall enter the "GMM-DEREGISTERED" state. In an embodiment, if the UE is requested for limited emergency services, or if the UE did not request emergency services, or if the cell is too congested for reliable emergency calls, then the UE may or shall search for a suitable cell according 3GPP TS 43.022 and/or 3GPP TS 25.304. The UE may or shall inform the upper layers of the non-availability of the emergency services. If the UE requested full emergency services, the UE may or shall attempt to attach requesting limited emergency services.

In another embodiment, if the ATTACH REJECT message is received, the UE may or shall reset the attach attempt counter and may or shall entered the EMM-DEREGISTERED state. If the UE requested limited emergency services, did not request emergency services, or if the cell is too congested for reliable emergency calls, then the UE may or shall search for a suitable cell according to 3GPP TS 36.304. The UE may or shall inform the upper layers of the non-availability of the emergency services. If the UE requested full emergency services, the UE may or shall attempt to attach requesting limited emergency services.

If the attach request cannot be accepted due to the lack of support in the femtocell of emergency services, due to the lack of support in the femtocell of the emergency services requested by the UE, or due to the cell being too congested for reliable emergency calls, the reject cause may or shall be set to a value indicating that #XX "Emergency Services Not available in CSG." In this case, the UE may or shall perform cell selection according to 3GPP TS 43.022 and/or 3GPP 25.304, and may or shall choose an appropriate sub-state. In an embodiment, the UE may or shall not select the same cell.

The UE may or shall then take one of the following actions depending upon the reject cause. The UE may or shall enter the state GMM-DEREGISTERED. If the UE requested limited emergency services, did not request emergency services, if emergency services are not available, or if the cell is too congested for reliable emergency calls, the UE may or shall search for a suitable cell according 3GPP TS 43.022 and/or 3GPP TS 25.304. The UE may or shall inform the upper layers of the non-availability of the emergency services. If the UE requested full emergency services, the UE may or shall attempt to attach requesting limited emergency services. If the UE returned to state GMM-DEREGISTERED because the UE has received an indication in the attach procedure or routing area procedure that no emergency services are available, that limited emergency services are available but limited emergency services are not acceptable, or that the cell is too congested for reliable emergency calls, then the UE sub-state may or shall be one of NO-EMERGENCY-SERVICES-AVAILABLE or LIMITED-EMERGENCY-SERVICES-AVAILABLE. The UE may or shall go to NORMAL-SERVICE if the absence of or limited nature of emergency services is acceptable.

Attach Request Message Content

The attach request message may be sent by the UE to the network in order to perform a GPRS or combined GPRS attach. An example of an attach request message according to the embodiments described herein is provided in the table reproduced below. The last IE in the table presented below may be an emergency services request indication. The embodiment may or shall be included in the message to indicate the type of emergency services the UE may require or desire.

| IEI | Information Element | Type/Reference | Presence | Format | Length |
|---|---|---|---|---|---|
| | Protocol discriminator | Protocol discriminator 10.2 | M | V | ½ |
| | Skip indicator | Skip indicator 10.3.1 | M | V | ½ |
| | Attach request message identity | Message type 10.4 | M | V | 1 |
| | MS network capability | MS network capability 10.5.5.12 | M | LV | 3-9 |
| | Attach type | Attach type 10.5.5.2 | M | V | ½ |
| | GPRS ciphering key sequence number | Ciphering key sequence number 10.5.1.2 | M | V | ½ |
| | DRX parameter | DRX parameter 10.5.5.6 | M | V | 2 |
| | P-TMSI or IMSI | Mobile identity 10.5.1.4 | M | LV | 6-9 |
| | Old routing area identification | Routing area identification 10.5.5.15 | M | V | 6 |
| | MS Radio Access capability | MS Radio Access capability 10.5.5.12a | M | LV | 6-52 |
| 19 | Old P-TMSI signature | P-TMSI signature 10.5.5.8 | O | TV | 4 |
| 17 | Requested READY timer value | GPRS Timer 10.5.7.3 | O | TV | 2 |
| 9- | TMSI status | TMSI status 10.5.5.4 | O | TV | 1 |
| 33 | PS LCS Capability | PS LCS Capability 10.5.5.22 | O | TLV | 3 |
| 11 | Mobile station classmark 2 | Mobile station classmark 2 10.5.1.6 | O | TLV | 5 |
| 20 | Mobile station classmark 3 | Mobile station classmark 3 10.5.1.7 | O | TLV | 2-34 |
| 40 | Supported Codecs | Supported Codec List 10.5.4.32 | O | TLV | 5-n |
| 58 | UE network capability | UE network capability 10.5.5.26 | O | TLV | 4-15 |
| 1A | Additional mobile identity | Mobile identity 10.5.1.4 | O | TLV | 7 |
| 1B | Additional old routing area identification | Routing area identification 2 10.5.5.15a | O | TLV | 8 |
| | Emergency Services Requested Indication | Required Emergency Service Type A.B.C.D | M | TLV | 1 |

Another example of an attach request message is as follows:

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Attach request message identity | Message type 9.8 | M | V | 1 |
| | EPS attach type | EPS attach type 9.9.3.11 | M | V | ½ |
| | NAS key set identifier | NAS key set identifier 9.9.3.21 | M | V | ½ |

| IEI | Information Element | Type/Reference | Presence | Format | Length |
|---|---|---|---|---|---|
|  | EPS mobile identity | EPS mobile identity 9.9.3.12 | M | LV | 5-12 |
|  | UE network capability | UE network capability 9.9.3.34 | M | LV | 3-14 |
|  | ESM message container | ESM message container 9.9.3.15 | M | LV-E | 2-n |
| 19 | Old P-TMSI signature | P-TMSI signature 10.5.5.8 | O | TV | 4 |
| 50 | Additional GUTI | EPS mobile identity 9.9.3.12 | O | TLV | 13 |
| 52 | Last visited registered TAI | Tracking area identity 9.9.3.32 | O | TV | 6 |
| 5C | DRX parameter | DRX parameter 9.9.3.8 | O | TV | 3 |
| 31 | MS network capability | MS network capability 9.9.3.20 | O | TLV | 4-10 |
| 13 | Old location area identification | Location area identification 9.9.2.2 | O | TV | 6 |
| 9- | TMSI status | TMSI status 9.9.3.31 | O | TV | 1 |
| 11 | Mobile station classmark 2 | Mobile station classmark 2 9.9.2.4 | O | TLV | 5 |
| 20 | Mobile station classmark 3 | Mobile station classmark 3 9.9.2.5 | O | TLV | 2-34 |
| 40 | Supported Codecs | Supported Codec List 9.9.2.10 | O | TLV | 5-n |
|  | Emergency Services Requested Indication | Required Emergency Service Type A.B.C.D | M | TLV | 1 |

The last IE may be an Emergency Services Requested Indication. This IE may or shall be included in the message to indicate the type of emergency services the UE requires.

The ATTACH ACCEPT message may be sent by the UE to the network in order to indicate that the corresponding attach request has been accepted. An example of an Attach Accept message according to the embodiments described herein is provided in the table reproduced below. The last IE in the table presented below may be an emergency services supported indication. The embodiment may or shall be included in the message to indicate the type of emergency services the UE may require or desire.

| IEI | Information Element | Type/Reference | Presence | Format | Length |
|---|---|---|---|---|---|
|  | Protocol discriminator | Protocol discriminator 10.2 | M | V | ½ |
|  | Skip indicator | Skip indicator 10.3.1 | M | V | ½ |
|  | Attach accept message identity | Message type 10.4 | M | V | 1 |
|  | Attach result | Attach result 10.5.5.1 | M | V | ½ |
|  | Force to standby | Force to standby 10.5.5.7 | M | V | ½ |
|  | Periodic RA update timer | GPRS Timer 10.5.7.3 | M | V | 1 |
|  | Radio priority for SMS | Radio priority 10.5.7.2 | M | V | ½ |
|  | Radio priority for TOM8 | Radio priority 2 10.5.7.5 | M | V | ½ |
|  | Routing area identification | Routing area identification 10.5.5.15 | M | V | 6 |
| 19 | P-TMSI signature | P-TMSI signature 10.5.5.8 | O | TV | 4 |
| 17 | Negotiated READY timer value | GPRS Timer 10.5.7.3 | O | TV | 2 |
| 18 | Allocated P-TMSI | Mobile identity 10.5.1.4 | O | TLV | 7 |
| 23 | MS identity | Mobile identity 10.5.1.4 | O | TLV | 7-10 |
| 25 | GMM cause | GMM cause 10.5.5.14 | O | TV | 2 |
| 2A | T3302 value | GPRS Timer 2 10.5.7.4 | O | TLV | 3 |
| 8C | Cell Notification | Cell Notification 10.5.5.21 | O | T | 1 |
| 4A | Equivalent PLMNs | PLMN List 10.5.1.13 | O | TLV | 5-47 |
| B- | Network feature support | Network feature support 10.5.5.23 | O | TV | 1 |
| 34 | Emergency Number List | Emergency Number List 10.5.3.13 | O | TLV | 5-50 |
| A- | Requested MS Information | Requested MS Information 10.5.5.25 | O | TV | 1 |
| 37 | T3319 value | GPRS Timer 2 10.5.7.4 | O | TLV | 3 |
| 38 | T3323 value | GPRS Timer 2 10.5.7.4 | O | TLV | 3 |
|  | Emergency Services Supported Indication | Supported Emergency Service Type A.B.C.E | M | TLV | 1 |

Another example of an attach accept message is as follows:

| IEI | Information Element | Type/Reference | Presence | Format | Length |
|---|---|---|---|---|---|
|  | Protocol discriminator | Protocol discriminator 9.2 | M | V | ½ |
|  | Security header type | Security header type 9.3.1 | M | V | ½ |
|  | Attach accept message identity | Message type 9.8 | M | V | 1 |
|  | EPS attach result | EPS attach result 9.9.3.10 | M | V | ½ |
|  | Spare half octet | Spare half octet 9.9.2.9 | M | V | ½ |
|  | T3412 value | GPRS timer 9.9.3.16 | M | V | 1 |
|  | TAI list | Tracking area identity list 9.9.3.33 | M | LV | 7-97 |
|  | ESM message container | ESM message container 9.9.3.15 | M | LV-E | 2-n |
| 50 | GUTI | EPS mobile identity 9.9.3.12 | O | TLV | 13 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3 |
|  | Emergency Services Supported Indication | Supported Emergency Service Type A.B.C.E | M | TLV | 1 |

The last IE may be an Emergency Services Supported Indication. This IE may or shall be included in the message to indicate the type of emergency services the network supports.

Session Management Procedures

Procedures similar to those presented above may be implemented with respect to other normal periodic session management procedures. An example of such a procedure may be to request a PDP context activation.

For example, in an embodiment, when the UE initiates the UE-requested PDP context activation, the UE may or shall include an indication of the type of emergency services the UE requires or desires. In turn, the network may or shall include in the ACTIVATE PDP CONTEXT ACCEPT an indication of the type of emergency services supported. The UE may or shall provide the indication of the type of emergency services supported to the upper layers.

If the PDP context activation procedure fails due to the lack of support in the femtocell of emergency services, due to the lack of support in the femtocell of the emergency services requested by the UE, or due to the cell being too congested for reliable emergency calls, the GMM cause value in the ACTIVATE PDP CONTEXT REJECT message may or shall be set to a value corresponding to "Emergency Services Not available in CSG." The message may or shall contain a cause code that may indicate one of the following causes. The UE may or shall reset the attach attempt counter and may or shall enter the state GMM-DEREGISTERED. If the UE requested limited emergency services, did not request emergency services, or the cell is too congested for reliable emergency calls, the UE may or shall search for a suitable cell in the same PLMN according to 3GPP TS 36.304.

The UE may or shall inform the upper layers of the non-availability of the emergency services. If the UE requested full emergency services, the UE may or shall attempt a TAU procedure by requesting limited emergency services.

The activate PDP context request message may be sent by the UE to the network to request activation of a PDP context. An example of a PDP context request message according to the embodiments described herein is provided in the table reproduced below. The last IE in the table presented below may be an emergency services requested indication. The embodiment may or shall be included in the message to indicate the type of emergency services the UE desires or requires.

| IEI | Information Element | Type/Reference | Presence | Format | Length |
| --- | --- | --- | --- | --- | --- |
|  | Protocol discriminator | Protocol discriminator 10.2 | M | V | ½ |
|  | Transaction identifier | Transaction identifier 10.3.2 | M | V | ½-3/2 |
|  | Activate PDP context request message identity | Message type 10.4 | M | V | 1 |
|  | Requested NSAPI | Network service access point identifier 10.5.6.2 | M | V | 1 |
|  | Requested LLC SAPI | LLC service access point identifier 10.5.6.9 | M | V | 1 |
|  | Requested QoS | Quality of service 10.5.6.5 | M | LV | 13-17 |
|  | Requested PDP address | Packet data protocol address 10.5.6.4 | M | LV | 3-19 |
| 28 | Access point name | Access point name 10.5.6.1 | O | TLV | 3-102 |
| 27 | Protocol configuration options | Protocol configuration options 10.5.6.3 | O | TLV | 3-253 |
| A- | Request type | Request type 10.5.6.17 | O | TV | 1 |
|  | Emergency Services Requested Indication | Required Emergency Service Type A.B.C.D | M | TLV | 1 |

The activate PDP context accept message may be sent by the network to the UE to acknowledge activation of a PDP context. An example of a PDP context request message according to the embodiments described herein is provided in the table reproduced below. The last IE in the table presented below may be an emergency services supported indication. The embodiment may or shall be included in the message to indicate the type of emergency services the PDP context supports.

| IEI | Information Element | Type/Reference | Presence | Format | Length |
| --- | --- | --- | --- | --- | --- |
|  | Protocol discriminator | Protocol discriminator 10.2 | M | V | ½ |
|  | Transaction identifier | Transaction identifier 10.3.2 | M | V | ½-3/2 |
|  | Activate PDP context accept message identity | Message type 10.4 | M | V | 1 |
|  | Negotiated LLC SAPI | LLC service access point identifier 10.5.6.9 | M | V | 1 |
|  | Negotiated QoS | Quality of service 10.5.6.5 | M | LV | 13-17 |
|  | Radio priority | Radio priority 10.5.7.2 | M | V | ½ |
|  | Spare half octet | Spare half octet 10.5.1.8 | M | V | ½ |
| 2B | PDP address | Packet data protocol address 10.5.6.4 | O | TLV | 4-20 |
| 27 | Protocol configuration options | Protocol configuration options 10.5.6.3 | O | TLV | 3-253 |
| 34 | Packet Flow Identifier | Packet Flow Identifier 10.5.6.11 | O | TLV | 3 |
| 39 | SM cause | SM cause 2 10.5.6.6a | O | TLV | 3 |
|  | Emergency Services Supported Indication | Supported Emergency Service Type A.B.C.E | M | TLV | 1 |

Another example of a normal periodic session management procedure is a UE-requested PDN connectivity procedure. If such a procedure is accepted by the network, then upon receipt of the PDN CONNECTIVITY REQUEST message, the MME may check whether the ESM information transfer flag is included. The network may or shall include in the ACTIVATE DEFAULT EPS BEARER CONTEXT REQUEST an indication of the type of emergency services supported. The UE may or shall provide the indication of the type of emergency services supported to the upper layers.

If connectivity with the requested PDN cannot be accepted by the network, the MME may or shall send a PDN CONNECTIVITY REJECT message to the UE. If the connectivity with the requested PDN procedure fails due to the lack of support in the femtocell of emergency services, due to the lack of support in the femtocell of the emergency services requested by the UE, or the cell being too congested for reliable emergency calls, the EMM cause value in the PDN CONNECTIVITY REJECT message may or shall be set to a value indicating #XX "Emergency Services Not available in CSG".

In an embodiment, the UE may or shall enter the ESM state BEARER CONTEXT INACTIVE. If the UE requested limited emergency services, did not request emergency services, or the cell is too congested for reliable emergency calls, the UE may or shall search for a suitable cell in the same PLMN according to 3GPP TS 36.304. The UE may or shall inform the upper layers of the non-availability of the emergency services. If the UE requested full emergency services, the UE may or shall attempt the connectivity with the requested PDN by requesting limited emergency services.

An example of a PDN connectivity request is presented in the table below. This message may be sent by the UE to the network to initiate establishment of a PDN connection.

Another example of a normal periodic session management procedure is a RAU procedure. The RAU request message may be sent by the UE to the network in order to request an update of the UE's location file or to request an IMSI attach for non-GPRS services. An example of RAU request message according to the embodiments described herein is provided in the table reproduced below. The last IE in the table presented below may be an emergency services requested indication. This IE may or shall be included in the message to indicate the type of emergency services the UE may require or desire.

| IEI | Information Element | Type/Reference | Presence | Format | Length |
|---|---|---|---|---|---|
|  | Protocol discriminator | Protocol discriminator 9.2 | M | V | ½ |
|  | EPS bearer identity | EPS bearer identity 9.3.2 | M | V | ½ |
|  | Procedure transaction identity | Procedure transaction identity 9.4 | M | V | 1 |
|  | PDN connectivity request message identity | Message type 9.8 | M | V | 1 |
|  | Request type | Request type 9.9.4.14 | M | V | ½ |
|  | PDN type | PDN type 9.9.4.10 | M | V | ½ |
| D- | ESM information transfer flag | ESM information transfer flag 9.9.4.5 | O | TV | 1 |
| 28 | Access point name | Access point name 9.9.4.1 | O | TLV | 3-102 |
| 27 | Protocol configuration options | Protocol configuration options 9.9.4.11 | O | TLV | 3-253 |
|  | Emergency Services Requested Indication | Required Emergency Service Type A.B.C.D | M | TLV | 1 |

The last IE may be an example of an Emergency Services Requested Indication. This IE may or shall be included in the message to indicate the type of emergency services the UE requires.

An example of an ACTIVATE DEDICATED EPS BEARER CONTEXT REQUEST message is provided in the table below. This message may be sent by the network to the UE to request activation of a dedicated EPS bearer context associated with the same PDN address or addresses and APN as an already active default EPS bearer context.

| IEI | Information Element | Type/Reference | Presence | Format | Length |
|---|---|---|---|---|---|
|  | Protocol discriminator | Protocol discriminator 9.2 | M | V | ½ |
|  | EPS bearer identity | EPS bearer identity 9.3.2 | M | V | ½ |
|  | Procedure transaction identity | Procedure transaction identity 9.4 | M | V | 1 |
|  | Activate dedicated EPS bearer context request message identity | Message type 9.8 | M | V | 1 |
|  | Linked EPS bearer identity | Linked EPS bearer identity 9.9.4.6 | M | V | ½ |
|  | Spare half octet | Spare half octet 9.9.2.9 | M | V | ½ |
|  | EPS QoS | EPS quality of service 9.9.4.3 | M | LV | 2-10 |
|  | TFT | Traffic flow template 9.9.4.16 | M | LV | 2-256 |
| 5D | Transaction identifier | Transaction identifier 9.9.4.17 | O | TLV | 3-4 |
| 30 | Negotiated QoS | Quality of service 9.9.4.12 | O | TLV | 14-18 |
| 32 | Negotiated LLC SAPI | LLC service access point identifier 9.9.4.7 | O | TV | 2 |
| 8- | Radio priority | Radio priority 9.9.4.13 | O | TV | 1 |
| 34 | Packet flow Identifier | Packet flow Identifier 9.9.4.8 | O | TLV | 3 |
| 27 | Protocol configuration options | Protocol configuration options 9.9.4.11 | O | TLV | 3-253 |
|  | Emergency Services Supported Indication | Supported Emergency Service Type A.B.C.E | M | TLV | 1 |

The last IE may be an Emergency Services Supported Indication. This IE may or shall be included in the message to indicate the type of emergency services the PDN connection supports.

| IEI | Information Element | Type/Reference | Presence | Format | Length |
|---|---|---|---|---|---|
|  | Protocol discriminator | Protocol discriminator 10.2 | M | V | ½ |
|  | Skip indicator | Skip indicator 10.3.1 | M | V | ½ |
|  | Routing area update request message identity | Message type 10.4 | M | V | 1 |
|  | Update type | Update type 10.5.5.18 | M | V | ½ |
|  | GPRS ciphering key sequence number | Ciphering key sequence number 10.5.1.2 | M | V | ½ |
|  | Old routing area identification | Routing area identification 10.5.5.15 | M | V | 6 |
|  | MS Radio Access capability | MS Radio Access capability 10.5.5.12a | M | LV | 6-52 |

| IEI | Information Element | Type/Reference | Presence | Format | Length |
|---|---|---|---|---|---|
| 19 | Old P-TMSI signature | P-TMSI signature 10.5.5.8 | O | TV | 4 |
| 17 | Requested READY timer value | GPRS Timer 10.5.7.3 | O | TV | 2 |
| 27 | DRX parameter | DRX parameter 10.5.5.6 | O | TV | 3 |
| 9- | TMSI status | TMSI status 10.5.5.4 | O | TV | 1 |
| 18 | P-TMSI | Mobile identity 10.5.1.4 | O | TLV | 7 |
| 31 | MS network capability | MS network capability 10.5.5.12 | O | TLV | 4-10 |
| 32 | PDP context status | PDP context status 10.5.7.1 | O | TLV | 4 |
| 33 | PS LCS Capability | PS LCS Capability 10.5.5.22 | O | TLV | 3 |
| 35 | MBMS context status | MBMS context status 10.5.7.6 | O | TLV | 2-18 |
| 58 | UE network capability | UE network capability 10.5.5.26 | O | TLV | 4-15 |
| 1A | Additional mobile identity | Mobile identity 10.5.1.4 | O | TLV | 7 |
| 1B | Additional old routing area identification | Routing area identification 2 10.5.5.15a | O | TLV | 8 |
| 11 | Mobile station classmark 2 | Mobile station classmark 2 10.5.1.6 | O | TLV | 5 |
| 20 | Mobile station classmark 3 | Mobile station classmark 3 10.5.1.7 | O | TLV | 2-34 |
| 40 | Supported Codecs | Supported Codec List 10.5.4.32 | O | TLV | 5-n |
|  | Emergency Services Requested Indication | Required Emergency Service Type A.B.C.D | M | TLV | 1 |

A RAU accept message may be sent by the network to the UE to provide the UE with GPRS mobility management related data in response to a RAU request message. An example of RAU accept request message according to the embodiments described herein is provided in the table reproduced below. The last IE in the table presented below may be an emergency services supported indication. The embodiment may or shall be included in the message to indicate the type of emergency services supported.

TRACKING AREA UPDATE REJECT message to the UE including an appropriate EMM cause value. If the tracking area updating fails due to the lack of support in the femtocell of emergency services, due to the lack of support in the femtocell of the emergency services requested by the UE, or due to the cell being too congested for reliable emergency calls, the EMM cause value in the TRACKING AREA UPDATE REJECT message may or shall be set to a value indicating #XX "Emergency Services Not available in CSG."

| IEI | Information Element | Type/Reference | Presence | Format | Length |
|---|---|---|---|---|---|
|  | Protocol discriminator | Protocol discriminator 10.2 | M | V | ½ |
|  | Skip indicator | Skip indicator 10.3.1 | M | V | ½ |
|  | Routing area update accept message identity | Message type 10.4 | M | V | 1 |
|  | Force to standby | Force to standby 10.5.5.7 | M | V | ½ |
|  | Update result | Update result 10.5.5.17 | M | V | ½ |
|  | Periodic RA update timer | GPRS Timer 10.5.7.3 | M | V | 1 |
|  | Routing area identification | Routing area identification 10.5.5.15 | M | V | 6 |
| 19 | P-TMSI signature | P-TMSI signature 10.5.5.8 | O | TV | 4 |
| 18 | Allocated P-TMSI | Mobile identity 10.5.1.4 | O | TLV | 7 |
| 23 | MS identity | Mobile identity 10.5.1.4 | O | TLV | 7-10 |
| 26 | List of Receive N-PDU Numbers | Receive N-PDU Number list 10.5.5.11 | O | TLV | 4-19 |
| 17 | Negotiated READY timer value | GPRS Timer 10.5.7.3 | O | TV | 2 |
| 25 | GMM cause | GMM cause 10.5.5.14 | O | TV | 2 |
| 2A | T3302 value | GPRS Timer 2 10.5.7.4 | O | TLV | 3 |
| 8C | Cell Notification | Cell Notification 10.5.5.21 | O | T | 1 |
| 4A | Equivalent PLMNs | PLMN List 10.5.1.13 | O | TLV | 5-47 |
| 32 | PDP context status | PDP context status 10.5.7.1 | O | TLV | 4 |
| B- | Network feature support | Network feature support 10.5.5.23 | O | TV | 1 |
| 34 | Emergency Number List | Emergency Number List 10.5.3.13 | O | TLV | 5-50 |
| 35 | MBMS context status | MBMS context status 10.5.7.6 | O | TLV | 2-18 |
| A- | Requested MS Information | Requested MS Information 10.5.5.25 | O | TV | 1 |
| 37 | T3319 value | GPRS Timer 2 10.5.7.4 | O | TLV | 3 |
| 38 | T3323 value | GPRS Timer 2 10.5.7.4 | O | TLV | 3 |
|  | Emergency Services Supported Indication | Supported Emergency Service Type A.B.C.E | M | TLV | 1 |

Another example of a normal periodic session management procedure is a TAU. If the TAU request has been accepted by the network, then the MME may or shall send a TRACKING AREA UPDATE ACCEPT message to the UE. In an embodiment, the network may or shall include in the TRACKING AREA UPDATE ACCEPT message an indication of the type of emergency services supported. The UE may or shall provide the indication of the type of emergency services to the upper layers.

If the TAU procedure, or a combined TAU procedure, cannot be accepted by the network, the MME may send a In this case, the UE may or shall reset the attach attempt counter and may or shall enter the state EMM-DEREGISTERED. If the UE requested for limited emergency services, did not request emergency services, or the cell is too congested for reliable emergency calls, the UE may or shall search for a suitable cell in the same PLMN according to 3GPP TS 36.304. The UE may or shall inform the upper layers of the non-availability of the emergency services. If the UE requested full emergency services, the UE may or shall attempt the TAU procedure by requesting limited emergency services.

An example of a TAU request message is as follows:

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Tracking area update request message identity | Message type 9.8 | M | V | 1 |
| | EPS update type | EPS update type 9.9.3.14 | M | V | ½ |
| | NAS key set identifier | NAS key set identifier 9.9.3.21 | M | V | ½ |
| | Old GUTI | EPS mobile identity 9.9.3.12 | M | LV | 12 |
| B- | Non-current native NAS key set identifier | NAS key set identifier 9.9.3.21 | O | TV | 1 |
| 8- | GPRS ciphering key sequence number | Ciphering key sequence number 9.9.3.4a | O | TV | 1 |
| 19 | Old P-TMSI signature | P-TMSI signature 9.9.3.26 | O | TV | 4 |
| 50 | Additional GUTI | EPS mobile identity 9.9.3.12 | O | TLV | 13 |
| 55 | Nonce$_{UE}$ | Nonce 9.9.3.25 | O | TV | 5 |
| 58 | UE network capability | UE network capability 9.9.3.34 | O | TLV | 4-15 |
| 52 | Last visited registered TAI | Tracking area identity 9.9.3.32 | O | TV | 6 |
| 5C | DRX parameter | DRX parameter 9.9.3.8 | O | TV | 3 |
| A- | UE radio capability information update needed | UE radio capability information update needed 9.9.3.35 | O | TV | 1 |
| 57 | EPS bearer context status | EPS bearer context status 9.9.2.1 | O | TLV | 4 |
| 31 | MS network capability | MS network capability 9.9.3.20 | O | TLV | 4-10 |
| 13 | Old location area identification | Location area identification 9.9.2.2 | O | TV | 6 |
| 9- | TMSI status | TMSI status 9.9.3.31 | O | TV | 1 |
| 11 | Mobile station classmark 2 | Mobile station classmark 2 9.9.2.4 | O | TLV | 5 |
| 20 | Mobile station classmark 3 | Mobile station classmark 3 9.9.2.5 | O | TLV | 2-34 |
| 40 | Supported Codecs | Supported Codec List 9.9.2.10 | O | TLV | 5-n |
| | Emergency Services Requested Indication | Required Emergency Service Type A.B.C.D | M | TLV | 1 |

The last IE may be an Emergency Services Requested Indication. This IE may or shall be included in the message to indicate the type of emergency services the UE requires.

Another message that may be sent is a TAU accept message. This message may be sent by the network to the UE to provide the UE with EPS mobility management related data in response to a tracking area update request message. The following table shows an example of a TAU accept message.

| 8 | 7 | 6 | 5 | 4 | 3 | 2 | 1 | |
|---|---|---|---|---|---|---|---|---|
| Required Emergency Service Type IEI | | | | | | | | octet 1 |
| Required Emergency Service Type | | | | | | | | |

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Tracking area update accept message identity | Message type 9.8 | M | V | 1 |
| | EPS update result | EPS update result 9.9.3.13 | M | V | ½ |
| | Spare half octet | Spare half octet 9.9.2.9 | M | V | ½ |
| 5A | T3412 value | GPRS timer 9.9.3.16 | O | TV | 2 |
| 50 | GUTI | EPS mobile identity 9.9.3.12 | O | TLV | 13 |
| 54 | TAI list | Tracking area identity list 9.9.3.33 | O | TLV | 8-98 |
| 57 | EPS bearer context status | EPS bearer context status 9.9.2.1 | O | TLV | 4 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3 |
| | Emergency Services Supported Indication | Supported Emergency Service Type A.B.C.E | M | TLV | 1 |

That last IE may be an Emergency Services Supported Indication. This IE may or shall be included in the message to indicate the type of emergency services the UE requires.

Supported Emergency Service Types

The embodiments described above with respect to attach and session management procedures provided for IEs having different supported emergency service types. Several different supported emergency service types are now described.

In an embodiment, a purpose of the Required Emergency Service Type information elements, described above, may be to provide the network with information about services invoked by the user equipment. The Required Emergency Service Type information element may be coded as shown in the tables below.

The Required Emergency Service Type may be a type 4 information element with a minimum length of 3 octets. The following table shows an exemplary D.E.F. Required Emergency Service Type embodiment.

The following table shows an exemplary G.H.I. Required Emergency Service Type embodiment.

| Required Emergency Service Type (octet 1) | |
|---|---|
| 0 0 | No emergency services required |
| 0 1 | Limited Emergency Services required |
| 1 0 | Full Emergency Services required |
| 1 1 | reserved |

The following provide for an exemplary, non-limiting A.B.C.E Supported Emergency Service Type. The Supported Emergency Service Type information element may be coded as shown in the tables below. The Supported Emergency Service Type may be a type 4 information element with a minimum length of 3 octets. The first table shown below is a non-limiting example of a D.E.F. Supported Emergency Service Type IE.

| 8 | 7 | 6 | 5 | 4 | 3 | 2 | 1 | |
|---|---|---|---|---|---|---|---|---|
| Supported Emergency Service Type IEI | | | | | | Supported Emergency Service Type | | octet 1 |

The table below is a non-limiting example of a G.H.I. Supported Emergency Service Type IE.

| | Supported Emergency Service Type (octet 1) |
|---|---|
| 0 0 | Emergency services not supported |
| 0 1 | Cell is too congested for reliable emergency calls |
| 1 0 | Limited Emergency Services supported |
| 1 1 | Full Emergency Services supported |

UE States

The embodiments described above with respect to attach and session management procedures mentioned various states, such as a GMM-DEREGISTERED state. The following embodiments describe GMM-DEREGISTERED sub-states.

In an embodiment, a GMM deregistered sub-state may be a "GMM-DEREGISTERED.NO-EMERGENCY-SERVICES-AVAILABLE" state. The UE may or shall enter this sub-state if it is known that a selected cell is unable to provide emergency services. For example, a UE in a GMM-REGISTERED state may have received an indication in the attach procedure or routing area procedure that no emergency services are available, that limited emergency services are available but limited emergency services are not acceptable, or that the cell is too congested for reliable emergency calls. The UE may enter the above sub-state while the MS is searching for other cells.

In addition to the GMM-DEREGISTERED state, a UE may also enter a GMM-REGISTERED state. The following are examples of GMM-REGISTERED sub-states. These sub-states may pertain to the whole UE, to the ME alone if no SIM/USIM is inserted, or to the ME plus SIM/USIM.

A first exemplary sub-state may be the GMM-REGISTERED.NO-EMERGENCY-SERVICES-AVAILABLE sub-state. This sub-state may be chosen by the UE if the attach or if the RAU procedure indicated that no emergency services are available or that the cell is too congested for reliable emergency calls. The UE may or shall either reselect to another cell in the same or different RAT or move to the GMM-REGISTERED.NORMAL-SERVICE sub-state if the absence of emergency services is acceptable. If the UE decides to reselect, the UE may or shall not initiate any EMM procedures, except for cell and PLMN reselection. In an embodiment, no data may or shall be sent or received.

A second exemplary sub-state may be the GMM-REGISTERED.LIMITED-EMERGENCY-SERVICES-AVAILABLE sub-state. This sub-state may be chosen by the UE if the attach or if the RAU procedure indicated that only limited emergency services are available. The UE may or shall reselect to another cell in the same or different RAT if limited emergency services are not acceptable. The UE may or shall move to the GMM-REGISTERED.NORMAL-SERVICE sub-state if limited emergency services are acceptable. If the UE decides to reselect, the UE may or shall not initiate any GMM procedures except for cell and PLMN reselection. In an embodiment, no data may or shall be sent or received.

In addition to GMM states, another state change that a UE may undergo is from one state to a MM IDLE state. When returning to MM IDLE, such as after a location updating procedure, the UE may select a cell as specified in 3GPP TS 43.022 and 3GPP TS 25.304. If the return to idle state is not subsequent to a location updating procedure terminated with reception of the cause "Roaming not allowed in this location area", the service state may depend on the result of the cell selection procedure, on the update status of the mobile station, on the location data stored in the mobile station, and/or on the presence of the SIM/USIM.

When returning to MM IDLE, if no cell has been found, the service state may be NO CELL AVAILABLE, until a cell is found. If no SIM/USIM is present, or if the inserted SIM/USIM is considered invalid by the UE, the service state may be NO IMSI.

Also when returning to MM IDLE, if the UE returned to the GMM-DEREGISTERED state from a GMM-REGISTERED state because the UE received an indication in the attach procedure or tracking area procedure or combined tracking area procedure that no emergency services are available, or that limited emergency services are available but limited emergency services are not acceptable, or that the cell is too congested for reliable emergency calls, then the sub-state may be NO-EMERGENCY-SERVICES-AVAILABLE. If the selected cell does not support emergency services, or it supports limited emergency services but limited emergency services are not acceptable, the sub-state may then be NO-EMERGENCY-SERVICES-AVAILABLE.

Another UE state may be the EMM-DEREGISTERED state. This state may be entered upon one or more conditions being triggered. Two non-limiting examples of such triggers are presented. One such trigger is when the attach request is accepted by the MME, but the MME indicated that no emergency services are available, that limited emergency services are available but limited emergency services are not acceptable, or that the cell is too congested for reliable emergency calls Another such trigger is when the TAU request is accepted by the MME, but the MME indicated that no emergency services are available, that limited emergency services are available but limited emergency services are not acceptable, or that the cell is too congested for reliable emergency calls. Upon entering the EMM-DEREGISTERED state, the UE may or shall perform cell selection according to 3GPP TS 36.304 and choose an appropriate sub-state when a cell is found. The UE may or shall not select the same cell. The UE may or shall not perform attach for emergency bearer services.

The EMM-DEREGISTERED state may be subdivided into a number of sub-states. Valid subscriber data may be available for the UE before the UE enters the sub-states, except for the sub-state EMM-DEREGISTERED.NO-IMSI.

An example of a sub-state of the EMM-DEREGISTERED state is the EMM-DEREGISTERED.NO-EMERGENCY-SERVICES-AVAILABLE sub-state. This sub-state may be chosen in the UE if the EPS update status is EU1 and it is known that a selected cell is unable to provide emergency services while the UE is searching for other cells. A selected cell may be known to be unable to provide emergency services when the UE in the EMM-REGISTERED state has received an indication in the attach procedure, tracking area procedure, or combined tracking area procedure that no emergency services are available, that limited emergency services are available but limited emergency services are not acceptable, or that the cell is too congested for reliable emergency calls.

Another UE state may be the EMM-REGISTERED state. This state may also be subdivided into a number of sub-states.

An example of an EMM-REGISTERED sub-state is the EMM-REGISTERED.NO-EMERGENCY-SERVICES-AVAILABLE sub-state. This sub-state may be chosen by the UE if the attach procedure, the tracking area updating, or combined tracking area updating procedure indicated that no emergency services are available or that the cell is too congested for reliable emergency calls. In this case, the UE may or shall reselect to another cell or move to the EMM-DEREGISTERED.NO-EMERGENCY-SERVICES-AVAILABLE sub-state. If the UE decides to reselect, the UE may or shall not initiate any EMM procedures, except for cell and PLMN reselection. No data may or shall be sent or received. The UE may or shall move to the EMM-REGISTERED.NORMAL-SERVICE sub-state if the absence of emergency services is acceptable.

Another example of an EMM-REGISTERED sub-state is the EMM-REGISTERED.LIMITED-EMERGENCY-SERVICES-AVAILABLE sub-state. This sub-state may be chosen by the UE if the attach, the tracking area updating, or the combined tracking area updating procedure indicated that only limited emergency services are available. The UE may or shall reselect to another cell or move to EMM-DEREGISTERED.NO-EMERGENCY-SERVICES-AVAILABLE if limited emergency services are not acceptable. If the UE decides to reselect, the UE may or shall not initiate any EMM procedures, except for cell and PLMN reselection. No data may or shall be sent or received. The UE may or shall move to the EMM-REGISTERED.NORMAL-SERVICE sub-state if limited emergency services are acceptable.

In some cases, the UE may return from EMM state back to the EMM-DEREGISTERED state. When returning to EMM-DEREGISTERED state, the UE may or shall select a cell as specified in 3GPP TS 36.304. The sub-state may depend on the result of the cell selection procedure, the outcome of the previously performed EMM specific procedures, on the EPS update status of the UE, on the tracking area data stored in the UE and on the presence of the USIM, or on any one of a number of factors. In an exemplary non-limiting embodiment, if the UE returned to state EMM-DEREGISTERED because the UE has received an indication in the attach procedure, tracking area procedure, or combined tracking area procedure that no emergency services are available, that limited emergency services are available but limited emergency services are not acceptable, or that the cell is too congested for reliable emergency calls, then the sub-state may or shall be NO-EMERGENCY-SERVICES-AVAILABLE.

Description of UE Behaviour in the EMM-REGISTERED State

In the NO-EMERGENCY-SERVICES-AVAILABLE sub-state, the UE may or shall perform cell selection or reselection according to 3GPP TS 36.304 if absence of emergency services is not acceptable. The UE may or shall go to the NORMAL-SERVICE state if absence of emergency services is acceptable.

In the LIMITED-EMERGENCY-SERVICES-AVAILABLE sub-state, the UE may or shall perform cell selection or reselection according to 3GPP TS 36.304 if limited emergency services are not acceptable. The UE may or shall go to the NORMAL-SERVICE state if limited emergency services are acceptable.

FIG. 6 is a flowchart of a process for initiating an emergency call in a UE, according to an embodiment of the present disclosure. The process shown in FIG. 6 may be implemented by a processor and other components, such as those shown in FIG. 11. The process shown in FIG. 6 may be implemented according to techniques and devices described with respect to FIG. 1 through FIG. 5, and according to the embodiments described elsewhere above.

The process begins as a call control entity in a UE initiates a mobile originating call by requesting an RRC connection for the purpose of making an emergency call (block 600). An RRC layer of the UE may determine that the request is for an emergency call and further determine that the UE is camped on one of a Home Evolved Node B (H(e)NB) cell or a Home Node B (HNB) cell (block 602). The RRC layer may initiate reselection to a different, non-femtocell (block 604). Finally, the RRC layer may perform an RRC connection establishment procedure (block 606).

FIG. 7 is a flowchart of a process of preparing to reselect to a macro cell, according to an embodiment of the present disclosure. The process shown in FIG. 7 may be implemented by a processor and other components, such as those shown in FIG. 11. The process shown in FIG. 7 may be implemented according to techniques and devices described with respect to FIG. 1 through FIG. 5, and according to the embodiments described elsewhere above.

The process begins as the UE prepares to reselect to a macro cell responsive to the UE placing an emergency call in one of a femtocell (block 700). The UE continues with the emergency call while the UE prepares for reselection (block 702). Preparing for reselection may include scanning for available macro cells or micro cells, as described elsewhere herein. The process terminates thereafter.

FIG. 8 is a flowchart of a process of indicating support for emergency calls, according to an embodiment of the present disclosure. The process shown in FIG. 8 may be implemented by a processor and other components, such as those shown in FIG. 11. The process shown in FIG. 8 may be implemented according to techniques and devices described with respect to FIG. 1 through FIG. 5, and according to the embodiments described elsewhere above.

The process begins as a UE receives an ECSI (block 800). The UE then attempts to attach to an available femtocell based on a value of the ECSI (block 802). The process terminates thereafter.

FIG. 9 is a flowchart of a process of indicating emergency call support, according to an embodiment of the present disclosure. The process shown in FIG. 9 may be implemented by a processor and other components, such as those shown in FIG. 11. The process shown in FIG. 9 may be implemented according to techniques and devices described with respect to FIG. 1 through FIG. 5, and according to the embodiments described elsewhere above.

The process begins as a network component transmits an ECSI (block 900). The network component may transmit a message configured to instruct a UE to connect to a femtocell when the UE places an emergency call (block 902). The process terminates thereafter.

FIG. 10 is a flowchart of a process of determining whether to place an emergency call, according to an embodiment of the present disclosure. The process shown in FIG. 10 may be implemented by a processor and other components, such as those shown in FIG. 11. The process shown in FIG. 10 may be implemented according to techniques and devices described with respect to FIG. 1 through FIG. 5, and according to the embodiments described elsewhere above.

The process begins as a UE receives an indication that one of a femtocell is congested (block 1000). Responsive to receiving the indication, the UE determines whether to place an emergency call on one of the femtocell (block 1002). The process terminates thereafter.

The UE and other components described above might include processing and other components that alone or in combination are capable of executing instructions or otherwise able to promote the occurrence of the actions described above. FIG. 11 illustrates an example of a system 1100 that includes a processing component, such as processor 1110, suitable for implementing one or more embodiments disclosed herein. In addition to the processor 1110 (which may be referred to as a central processor unit or CPU), the system 1100 might include network connectivity devices 1120, random access memory (RAM) 1130, read only memory (ROM) 1140, secondary storage 1150, and input/output (I/O) devices 1160. These components might communicate with one another via a bus 1100. In some cases, some of these components may not be present or may be combined in various combinations with one another or with other components not shown. These components might be located in a single physical entity or in more than one physical entity. Any actions described herein as being taken by the processor 1110 might be taken by the processor 1110 alone or by the processor 1110 in conjunction with one or more components shown or not shown in the drawing, such as a digital signal processor (DSP) 1180. Although the DSP 1180 is shown as a separate component, the DSP 1180 might be incorporated into the processor 1110.

The processor 1110 executes instructions, codes, computer programs, or scripts that it might access from the network connectivity devices 1120, RAM 1130, ROM 1140, or secondary storage 1150 (which might include various disk-based systems such as hard disk, floppy disk, or optical disk). While only one CPU 1110 is shown, multiple processors may be present. Thus, while instructions may be discussed as being executed by a processor, the instructions may be executed simultaneously, serially, or otherwise by one or multiple processors. The processor 1110 may be implemented as one or more CPU chips.

The network connectivity devices 1120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1120 may enable the processor 1110 to communicate with the Internet or one or more telecommunications networks or other networks from which the processor 1110 might receive information or to which the processor 1110 might output information. The network connectivity devices 1120 might also include one or more transceiver components 1125 capable of transmitting and/or receiving data wirelessly.

The RAM 1130 might be used to store volatile data and perhaps to store instructions that are executed by the processor 1110. The ROM 1140 is a non-volatile memory device that typically has a smaller memory capacity than the memory capacity of the secondary storage 1150. ROM 1140 might be used to store instructions and perhaps data that are read during execution of the instructions. Access to both RAM 1130 and ROM 1140 is typically faster than to secondary storage 1150. The secondary storage 1150 is typically comprised of one or more disk drives or tape drives and might be used for non-volatile storage of data or as an over-flow data storage device if RAM 1130 is not large enough to hold all working data. Secondary storage 1150 may be used to store programs that are loaded into RAM 1130 when such programs are selected for execution.

The I/O devices 1160 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1125 might be considered to be a component of the I/O devices 1160 instead of or in addition to being a component of the network connectivity devices 1120.

Thus, the embodiments provide for a user equipment (UE) including one or more processors configured to receive an emergency calls supported indicator (ECSI). The embodiments also contemplate a network component having one or more processors configured to cause the network component to transmit an ECSI.

In another embodiment, a method is provided that is implemented in a user equipment (UE) for indicating support for emergency calls. The method includes receiving an emergency calls supported indicator (ECSI). In still another embodiment, a method is provided that is implemented in a network component for indicating emergency call support. The method includes transmitting an emergency calls supported indicator (ECSI).

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE), comprising:
a processor configured to cause the UE to:
transmit an emergency calls required indicator (ECRI) to a network component responsive to the UE receiving an instruction to place an emergency call; and
   receive an emergency calls supported indicator (ECSI) prior to placing the emergency call, wherein a value of the ECSI indicates a type of emergency services supported by a femtocell,
wherein the processor is further configured to cause the UE to transmit the ECRI before receiving the ECSI.

2. The UE of claim 1 wherein the processor is configured to attempt to attach to an available femtocell based on the value of the ECSI.

3. The UE of claim 1 wherein the processor is further configured to cause the UE to attach to an femtocell if the value of the ECSI indicates that the femtocell supports emergency calls.

4. The UE of claim 1 wherein the processor is further configured to cause the UE to attach to a femtocell if the value of the ECSI indicates that the femtocell provides limited support for emergency calls.

5. The UE of claim 1 wherein the processor is further configured to cause the UE to attach to a macro cell if the value of the ECSI indicates that an available femtocell does not support emergency calls.

6. The UE of claim 1 wherein the processor is further configured to cause the UE to attach to a macro cell if the value of the ECSI indicates that an available femtocell provides limited support for emergency calls.

7. The UE of claim 1 wherein the processor is further configured to cause the UE to attach to an available femtocell based on a determination made by the UE.

8. The UE of claim 1 wherein the ECSI is received in broadcast information.

9. The UE of claim 1 wherein the ECSI is received in one of non-access stratum (NAS) signaling or access stratum (AS) signaling.

10. The UE of claim 1 wherein the ECSI is received upon one of initial attachment, a routing area update, and a tracking area update.

11. The UE of claim 1 wherein the value of the ECSI indicates support of limited emergency services by an available femtocell.

12. The UE of claim 11 wherein the value of the ECSI indicates that the limited emergency services comprise non-guaranteed emergency services.

13. The UE of claim 1 wherein the processor is further configured to prompt a user to provide input regarding at least one of whether to attach to an available femtocell and how to attach to the available femtocell.

14. The UE of claim 1 wherein the ECSI is received responsive to transmitting the ECRI.

15. The UE of claim 1 wherein the ECRI indicates if limited emergency services are sufficient for the UE to place the emergency call.

16. The UE claim 1 wherein the ECRI indicates if full emergency services are required for the UE to place the emergency call.

17. A network component, comprising:
a processor configured to cause the network component to:
receive an emergency calls required indicator (ECRI) from a user equipment (UE) responsive to the UE receiving an instruction to place an emergency call; and
transmit an emergency calls supported indicator (ECSI) to the UE prior to the UE placing the emergency call, wherein a value of the ECSI indicates a type of emergency services supported by the network component,
wherein the processor is further configured to cause the network component to receive the ECRI before transmitting the ECSI.

18. The network component of claim 17 wherein the network component comprises a femtocell and wherein the value of the ECSI indicates whether the femtocell supports one of limited emergency services or full emergency services.

19. The network component of claim 18 wherein the processor is further configured to transmit a message to the UE instructing the UE to connect to the femtocell when the UE places the emergency call.

20. The network component of claim 18 wherein the processor is further configured to transmit a message to the UE instructing the UE to avoid connecting to the femtocell when the UE places the emergency call.

21. The network component of claim 17 wherein the processor is further configured to cause the value of the ECSI to correspond to one of no emergency services support, limited emergency services support, or full emergency services support.

22. A method, implemented in a user equipment (UE) for indicating support for emergency calls, the method comprising:
transmitting, by the UE, an emergency calls required indicator (ECRI) to a network component responsive to the UE receiving an instruction to place an emergency call; and
receiving, by the UE, an emergency calls supported indicator (ECSI) prior to placing the emergency call, wherein a value of the ECSI indicates a type of emergency services supported by a network,
wherein the ECRI is transmitted by the UE before receiving the ECSI.

23. The method of claim 22 further comprising:
attempting, by the UE, to attach to an available femtocell based on the value of the ECSI.

24. The method of claim 22 further comprising:
attaching, by the UE, to a femtocell if the value of the ECSI indicates that the femtocell support emergency calls or provide limited support for emergency calls.

25. The method of claim 22 further comprising:
attaching, by the UE, to a macro cell if the value of the ECSI indicates that an available femtocell does not support emergency calls or provide limited support for emergency calls.

26. The method of claim 22 wherein the value of the ECSI indicates support of limited emergency services by an available femtocell.

27. The method of claim 26 wherein the value of the ECSI indicates that the limited emergency services comprise non-guaranteed emergency services.

28. The method of claim 22 further comprising:
prompting, by the UE, a user to provide input regarding at least one of whether to attach to an available femtocell and how to attach to an available femtocell.

29. The method of claim 22 wherein the ECSI is received responsive to transmitting the ECRI.

30. The method of claim 22 wherein the ECRI indicates if limited emergency services are sufficient for the UE to place the emergency call.

31. The method of claim 22 the ECRI indicates if full emergency services are required for the UE to place the emergency call.

32. A method, implemented in a network component for indicating emergency call support, the method comprising:
receiving, by the network component, an emergency calls required indicator (ECRI) from a user equipment (UE) responsive to the UE receiving an instruction to place an emergency call; and
transmitting, by the network component, an emergency calls supported indicator (ECSI) to the UE prior to the UE placing the emergency call, wherein a value of the ECSI indicates a type of emergency services supported by the network component, wherein the ECRI is received by the network component before transmitting the ECSI.

33. The method of claim 32 wherein the network component comprises a femtocell and wherein the value of the ECSI indicates whether the femtocell supports one of limited emergency services or full emergency services.

34. The method of claim 33 further comprising:
transmitting, by the network component, a message configured to instruct the UE to connect to the femtocell when the UE places the emergency call.

35. The method of claim 33 further comprising:
transmitting, by the network component, a message configured to instruct the UE to avoid connecting to the femtocell when the UE places the emergency call.

36. The method of claim 32 further comprising:
configuring, by the network component, the value of the ECSI to correspond to one of no emergency services support, limited emergency services support, or full emergency services support.

37. A user equipment (UE), comprising:
a processor configured to cause the UE to:
transmit an emergency calls required indicator (ECRI) to a network component responsive to the UE receiving an instruction to place an emergency call; and
receive an emergency calls supported indicator (ECSI) from a network component prior to placing the emergency call, a value of the ECSI indicating at least one emergency service supported by the network component,
wherein the processor is further configured to cause the UE to transmit the ECRI before receiving the ECSI.

38. A network component, comprising:
a processor configured to cause the network component to:
receive an emergency calls required indicator (ECRI) from a user equipment (UE) responsive to the UE receiving an instruction to place an emergency call; and
transmit an emergency calls supported indicator (ECSI) to the UE prior to the UE placing the emergency call, a value of the ECSI indicating at least one emergency service supported by the network component,
wherein the processor is further configured to cause the network component to receive the ECRI before transmitting the ECSI.

* * * * *

UNITED STATES PATENT AND TRADEMARK OFFICE
CERTIFICATE OF CORRECTION

| | |
|---|---|
| PATENT NO. | : 8,811,935 B2 |
| APPLICATION NO. | : 12/686249 |
| DATED | : August 19, 2014 |
| INVENTOR(S) | : Stefano M. Faccin et al. |

It is certified that error appears in the above-identified patent and that said Letters Patent is hereby corrected as shown below:

IN THE CLAIMS:

Claim 3, Column 57, Line 2 replace "an" with --the--

Claim 31, Column 58, Line 49 replace "claim 22 the" with --claim 22 wherein the--

Signed and Sealed this
Third Day of February, 2015

Michelle K. Lee
*Deputy Director of the United States Patent and Trademark Office*